United States Patent [19]

Hourai et al.

[11] Patent Number: 4,990,545

[45] Date of Patent: Feb. 5, 1991

[54] ARTICLES WITH POLYURETHANE RESIN HAVING MEMORY SHAPE CHARACTERISTICS AND METHOD OF UTILIZING SAME

[75] Inventors: Kouzi Hourai; Yoshio Kobayashi; Katsuhiko Ikegami, all of Kyoto, Japan

[73] Assignee: Sanyo Chemical Industries, Ltd., Kyoto, Japan

[21] Appl. No.: 401,862

[22] Filed: Sep. 1, 1989

[30] Foreign Application Priority Data

| Sep. 5, 1988 | [JP] | Japan | 63-221970 |
| Sep. 27, 1988 | [JP] | Japan | 63-243704 |
| Oct. 18, 1988 | [JP] | Japan | 63-262478 |
| Nov. 8, 1988 | [JP] | Japan | 63-282149 |
| Nov. 15, 1988 | [JP] | Japan | 63-288503 |
| Mar. 30, 1989 | [JP] | Japan | 1-81171 |

[51] Int. Cl.$^5$ .............................................. C08G 18/14
[52] U.S. Cl. ........................................ 521/171; 521/177; 521/70; 521/79; 427/261; 427/264; 427/273; 427/336; 427/352; 427/373
[58] Field of Search ............... 521/171, 177; 528/70, 528/79; 427/261, 264, 273, 336, 352, 373

[56] References Cited

U.S. PATENT DOCUMENTS

| 3,563,973 | 2/1971 | Arditti et al. | 260/949 |
| 4,193,899 | 3/1980 | Brenner et al. | 264/230 |
| 4,637,944 | 1/1987 | Walker | 428/35 |

FOREIGN PATENT DOCUMENTS

| 53-85896 | 7/1978 | Japan . |
| 61-207866 | 9/1986 | Japan . |
| 61-292587 | 12/1986 | Japan . |

*Primary Examiner*—Maurice J. Welsh
*Attorney, Agent, or Firm*—Birch, Stewart, Kolasch & Birch

[57] ABSTRACT

A thermoplastic or thermoset article, a porous sheet, a paint composition, and a synthetic leather which are characterized with a memory shape or a healable characteristics comprising a polyurethane resin obtained by reacting a polyisocyanate and aromatic and/or alicyclic polyol is disclosed. The polyurethane comprises at least 15% by weight in total of a ring component derived from the above polyol.

The original (memorized) shape of the article or the porous sheet is reshaped into another desired form below 130° C., and locked into below 40° C. Those material can be reverted back to their original shape by heating above 40° C. The memorized shape as an original shape of the thermoplastic article or the porous sheet can be changed by maintaining it in a desired shape at a temperature 130°~230° C.

When the paint or the synthetic leather is scratched or creased to its surface, they can be healed by heating above 40° C.

42 Claims, No Drawings

ARTICLES WITH POLYURETHANE RESIN HAVING MEMORY SHAPE CHARACTERISTICS AND METHOD OF UTILIZING SAME

BACKGROUND OF THE INVENTION

1. Field of the Invention

This invention relates to a thermoplastic or thermoset article, a porous sheet, a paint composition, and a synthetic leather comprising a polyurethane resin with a memory shape or with a healable characteristics therewith, utilizable in the field of paint material, automobile parts material, machinery material, electric material, constructing material as filling, sealing and caulking, medical material, decorating material and clothing material.

2. Description of the Prior Art

It has previously been proposed to provide a resin article with a memory shape by several patented inventions. U.S. Pat. No. 4,193,899 to Lundberg et al discloses neutralized sulfonated elastomeric polymers derived from unsaturated elastomeric polymers such as EDPM terpolymers from substituted norbornen. U.S. Pat. No. 4,637,944 to Walker and U.S. Pat. No. 3,563,973 to Plainview et al disclose a ethylene polymer acquires a memory shape by a method of cross linking by energy irradiation. However, in the former prior art where the process of preparing the resin is not only complicated, but also it takes a long time for locking a shape and reversion to a memory shape. In the latter prior art, it requires too complex process such as cross-linking after shaping.

In regard to porous sheets, for instance, it is described in Japanese Pat. Publication No. 54-20557 that a porous sheet can be obtained from a polyurethane solution comprising a polyurethane obtained by reacting 4,4'-diphenylmethane diisocyanate and ethylene glycol and a organic solvent, by extracting the solvent from the solution on a substrate with a non-solvent. Whereas, this porous sheet has high permeability but very poor memory shape characteristics.

Referring to manufacturing methods of a synthetic leather with tough mar-resistibility, one of known methods described in Japanese Pat. Publication No. 59-21990 is to coat a solution of a high modulus modified acrylic polyurethane resin applied onto a substrate, and to remove the solvent component from the coated solution by drying. These synthetic leathers obtained by those method has a strongly mar-resistible characteristics, however, unfortunately, their healable characteristics is not so perfect as to revert back to their original unmarred surface once they are marred, scratched, or creased.

As for paint material, as it is described in Japanese Pat. Publication No. 49-38685, a polyurethane resin obtained by reacting 4,4'-dicyclohexylmethane diisocyanate, and polyethertriol obtained from trimethylol propane and propylene oxide is mixed with other paint components to make up a hard surface coating paint which is strongly mar-resistant after being applied, dried and cured. However problems thereby exist in that said paint practically non-healable and unable to remove completely any scratch given thereon.

Ordinary plastic and rubber articles have no specific of said memory shape nor healable characteristics. For example, an ordinary plastic can be locked in a reshaped form, but cannot revert back to its original shape by heating or the other simple method. And also, an ordinary rubber cannot be locked in a reshaped form at room temperature.

SUMMARY OF THE INVENTION

In accordance with the present invention, a thermoplastic or thermoset article, a porous sheet, a paint composition, and a synthetic leather comprising a polyurethane resin of a specific chemical composition with a memory shape or with a healable characteristics, therewith and applications of those materials are provided which avoids most of the abovementioned problems. And also a method for preparing the porous sheet is provided.

Accordingly, an object of this invention is to provide a thermoplastic or thermoset article characterized with a memory shape. Said article comprises a polyurethane resin which is constructed a specific chemical composition as described as later obtained by a simplified process in stead of aforementioned prior complicated process. The original (memorized) shape of the article is reshaped into another desired form below about 130° C., and locked into the reshaped form by cooling to below about 40° C. This article with the reshaped form can be reverted back to the pre-reshaped form, i.e. original shape by application of mild heating above about 40° C. The memorized shape of the thermoplastic article as an original shape can be changed into another memorized shape as the original shape by maintaining it in the original, determined shape at a temperature 130~230° C.

Another object of this invention is to provide a porous sheet characterized with a memory shape. Said porous sheet comprises a polyurethane resin which has the similar chemical composition to the abovementioned polyurethane resin. The memorized shape as an original shape of said porous sheet can be changed into another memorized shape as an original shape by maintaining it in an original, determined shape at a temperature 130~230° C. The memorized shape is reshaped into another desired form below about 130° C. and locked into the reshaped form by cooling to below about 40° C. This porous sheet with the reshaped form can be reverted back to the pre-reshaped form, i.e. original shape by application of mild heating above about 40° C.

A further object of this invention is to provide a paint composition characterized with healable characteristics comprising the similar polyurethane resin to the abovementioned. And also it is to provide a healable synthetic leather covered with polyurethane resin which is the similar to the abovementioned. When their surface comprising the polyurethane resin were scratched or creased, it is healed by mild heating the marred coated surface above about 40° C.

In this description, the expression "original shape" denotes such as a original shape formed in a molding process, or the determined shape by maintaining in a article in the determined shape at a temperature of 130~230° C.

The expression "with memory shape" denotes a property of reshaping the original shape into another desired form below about 130° C. and locking into the reshaped form below about 40° C., and reverting back from a locked reshaped form to the original shape by heating, and the expression "healable characteristics" denotes a property of recovering physical deforms such as scratches, creases and dent marks made on a surface to the former surface in a short duration of time by heating.

There and other objects of the invention will become more apparent in the detailed description and examples which follow.

DETAILED DESCRIPTION

This invention presents a thermoplastic article characterized with a memory shape and a porous sheet characterized with a memory shape comprising a polyurethane resin obtained by reacting an organic polyisocyanate with at least one polyol selected from the compounds consisting of the following, and a synthetic leather characterized with healable characteristics coated with the abovementioned polyurethane resin:

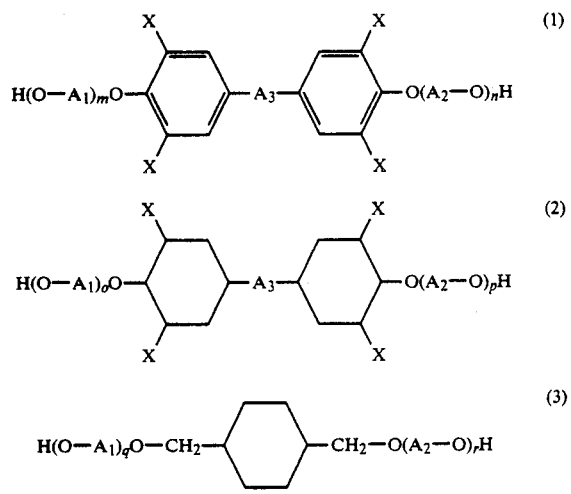

wherein:
$A_3$ is

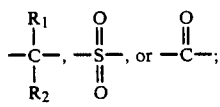

and $R_1$, $R_2$ are each hydrogen, an alkyl group with 1~3 carbon atoms, fluorine, or chlorine;
$A_1$ and $A_2$ are each an alkylene group having 2~4 carbon atoms;
m and n are each a positive integers satisfying $2 \leq m+n \leq 10$
o and p are each 0 or a positive integers satisfying $0 \leq o+p \leq 10$
q and r are each 0 or a positive integers satisfying $0 \leq q+r \leq 10$
X is hydrogen, or a methyl group;
and wherein at least about 15% by weight in the polyurethane resin comprises at least one ring component shown by the following (to be called the ring component).

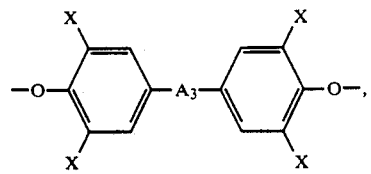

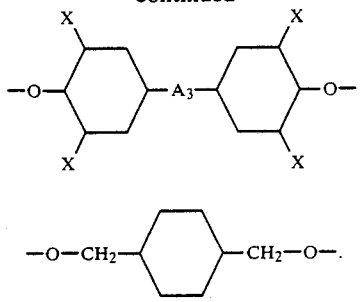

wherein $A_3$ and X are as defined above, presents a method for preparing the porous sheet, presents the thermoplastic article and the porous sheet wherein the memorized shape is an original, determined shape and is formed by maintaining the abovementioned material in the original, determined shape at a temperature of 130~230° C., presents the thermoplastic article and the porous sheet wherein the memorized shape is reshaped into another desired form below about 130° C. and locked into the reshaped form below about 40° C., presents a method for reverting the abovementioned reshaped form of the thermoplastic article and the porous sheet to the original shape thereof comprising heating reshaped form above about 40° C., and presents a method for healing from a marred coated surface of the synthetic leather disclosed by this invention which comprises heating the marred coated surface above about 40° C.

Also this invention presents a paint composition characterized with healable characteristics comprising a polyurethane resin. This polyurethane resin is obtained by reacting a organic polyisocyanate which is an aliphatic and/or alicyclic polyisocyanate with the same polyol as the abovementioned polyurethane resin, and presents a method for healing from marred coating, a coating derived from the paint composition of disclosing in this invention which comprises heating the marred coating above about 40° C.

Also, this invention presents a thermoset article characterized with a memory shape comprising a polyurethane resin obtained by reacting an organic polyisocyanate and at least one polyol selected from the compounds consisting of:

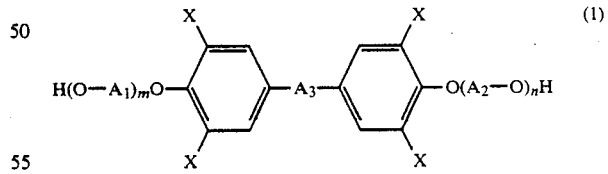

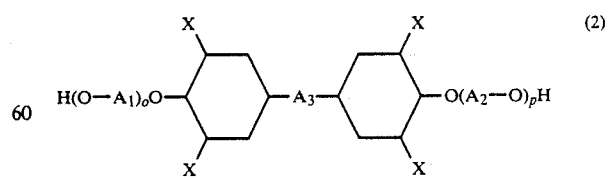

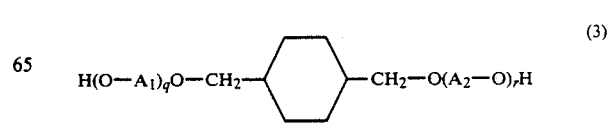

wherein:
$A_3$ is

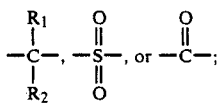

and $R_1$, $R_2$ are each hydrogen, an alkyl group with 1~3 carbona toms, fluorine, or chlorine;
$A_1$ and $A_2$ are each an alkylene group having 2~4 carbon atoms;
m and n are each a positive integers satisfying $2 \leq m+n \leq 10$
o and p are each 0 or a positive integers satisfying $0 \leq o+p \leq 10$
q and r are each 0 or a positive integers satisfying $0 \leq q+r \leq 10$
X is hydrogen, or a methyl group;
and there being of the polyol(s) at least about 80% by equivalent weight in total reacted polyol(s), and wherein at least about 15% by weight in the polyurethane resin comprises at least one ring component shown by the following,

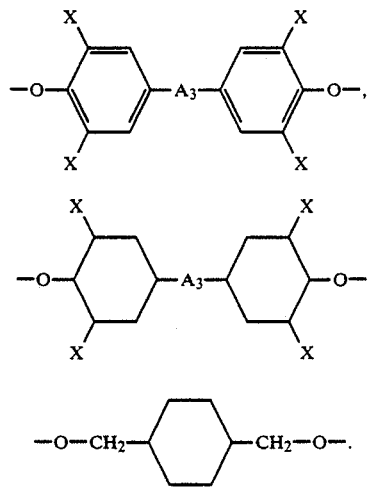

wherein $A_3$ and X are as defined above, presents the thermoset article wherein the memorized shape is reshaped into another desired form below about 130° C. and locked into the reshaped form below about 40° C., and presents a method for reverting the abovementioned reshaped form of the thermoset article to the original shape thereof comprising heating the reshaped form above about 40° C.

And also, this invention presents the thermoplastic article disclosed by this invention which is coated with the abovementioned paint composition disclosed by this invention, presents this thermoplastic article wherein the memorized shape is an original, determined shape and is formed by maintaining this thermoplastic article in the original, determined shape at a temperature of 130~230 ° C., presents this thermoplastic article wherein the memorized shape is reshaped into another desired form below about 130 ° C. and locked into the reshaped form below about 40° C., presents a method for reverting the abovementioned reshaped form of this thermoplastic article to the original shape thereof comprising heating reshaped form above about 40° C., and presents a method for healing from a marred coating coated on this thermoplastic article which comprises heating the marred coating above about 40° C.

Furthermore, this invention presents the thermoset article disclosed by this invention which is coated with the abovementioned paint composition disclosed by this invention, presents this thermoset article wherein the memorized shape is reshaped into another desired form below 130° C. and locked into the reshaped form below about 40° C., presents a method for reverting the abovementioned reshaped form of this thermoset article to the original shape thereof comprising heating reshaped form above about 40° C., and presents a method for healing from a marred coating coated on this thermoset article which comprises heating the marred coating above about 40° C.

Referring first in particular to said organic polyisocyanates [to be called (I)], it is suitable to select for this invention, aromatic polyisocyanates such as 4,4'-diphenylmethane diisocyanate, 2,4-tolylene diisocyanate, 2,6-tolylene diisocyanate, mixture of 2,4-tolylene diisocyanate and 2,6-tolylene diisocyanate, xylylene diisocyanate, trimer of diphenylmethane diisocyanate, polyphenylmethane polyisocyanate, trimer of tolylene diisocyanate, adduct of 1 mole of trimethylol propane and 3 moles of tolylene diisocyanate, modified polyisocyanate (4,4'-diphenylmethane diisocyanate modified to contain carbodiimide group, uretidion group or uretoneimine group); aliphatic polyisocyanates such as hexamethylene diisocyanate, trimer of hexamethylene diisocyanate, adduct of 1 mole of trimethylol propane and 3 moles of hexamethylene diisocyanate, polyisocyanate reacting hexamethylene diisocyanate with water (HDI Biuret); alicyclic polyisocyanates such as 4,4'-dicyclohexylmethane diisocyanate, isophorone diisocyanate, trimer of 4,4'-dicyclohexylmethane diisocyanate, trimer of isophorone diisocyanate, and mixture of more than two of those compounds.

In regard to polyisocyanates, it is preferable for memory shape composition to select 4,4'-diphenylmethane diisocyanate, 2,4-tolylene diisocyanate, 2,6-tolylene diisocyanate, mixture of 2,4-tolylene diisocyanate and 2,6-tolylene diisocyanate, adduct of 1 mole of trimethylolpropane and 3 moles of hexamethylenediisocyanate, HDI Biuret, 4,4'-dicyclohexylmethane diisocyanate, isophorone diisocyanate, and mixture of more than two of those compounds.

4,4'-diphenylmethane diisocyanate and 4,4'-dicyclohexylmethane diisocyanate are more preferable.

Referring in particular to aliphatic and alicyclic polyisocyanates, being used for the polyurethane resin comprized in the paint composition, it is preferable to select for the purpose of healable characteristics hexamethylene diisocyanate, adduct of 1 mole of trimethylol propane and 3 moles of hexamethylene diisocyanate, HDI Biuret, 4,4'-dycyclohexylmethane diisocyanate, isophorone diisocyanate, and mixture of more than two of those aliphatic and/or alicyclic polyisocyanates. 4,4'-dicyclohexylmethane diisocyanate and isophorone diisocyanate are more preferable for the purpose.

Referring in particular to the abovementioned general formulae (1), (2), (3) of polyol, as to alkylene group with 2~4 carbon atoms, represented as $A_1$, $A_2$ in general formulae (1), (2), (3) of polyol, ethylene group, propylene group and butylene group are selected. And ethylene group is more preferable for memory shape.

For m and n shown in general formula (1), positive integers are selected preferably $2 \leq m+n \leq 4$, but if the integer of m+n is more than 4, memory shape capability decreases. Positive integers which satisfy $2 \leq m+n \leq 2.5$ are more preferable for locking of shape. Herein, $m+n=2.5$ represents, such as, a mixture of equal amount of 2mole-adduct and 3 mole -adduct.

For o and p in general formula (2), 0 or positive integers which satisfy $0 \leq o+p \leq 4$, are preferable, whereas $o+p$ is more than 4, memory shape capability decreases. 0 is more preferable for locking of shape.

For q and r in general formula (3), 0 or positive integers which satisfy $0 \leq q+r \leq 4$, are preferable, whereas $q+r$ is more than 4, memory shape capability decreases. 0 is more preferable for locking of shape.

As to alkyl group with 1~3 carbon atoms, represented as $R_1$, $R_2$ in general formulae (1), (2), and (3), methyl group, ethyl group and butyl group are selected. Among these, methyl group is more preferable for the memory shape.

An chemical compound shown in general formula (1) is prepared by a process of ring-opening addition of alkylene oxide at random or in block, to any one or a mixture of bisphenols, such as 4,4'-methylenebisphenol, 4,4-isopropylidenbisphenol, 4,4'-sulfonylbisphenol, and 4,4'-dihydroxybenzophenone. Example of alkylene oxide group with 2~4 carbon atoms, are ethylene oxide, propylene oxide, and butylene oxide. It is more preferable to select ethylene oxide for ring-opening addition for memory shape. The ratio of addition is 1 mole or more of alkylene oxide to be added against 1 OH radical of bisphenol, whereas it is preferable to keep number of added moles less than 4 against 1 mole of bisphenol, or if such number is larger than 4, memory shape capability decreases.

Examples of the addition compounds are as follows; 4,4'-methylenebisphenol with 2 moles of ethylene oxide, 4,4'-methylenebisphenol with 2 moles of propylene oxide, 4,4'-methylenebisphenol with 2 moles of ethylene oxide and 2 moles of propylene oxide, 4,4'-methylenebisphenol with 4 moles of butylene oxide, 4,4'-isopropylidenbisphenol with 2 moles of ethylene oxide, 4,4'-dihydroxy benzophenon with 2 moles of propylene oxide.

A diol compound shown in general formula (2) is any one or a mixture of hydrogenation-compounds of benzen nucleus of bisphenol compounds shown general formula (1) or alkylene oxide adduct thereto, such as, bis(4-hydroxy-cyclohexyl) methane, 2,2-bis(4-hydroxy-cyclohexyl)propane, 3,3-bis(4-hydroxy-cyclohexyl)-pentane, abovementioned compounds added with said alkylene oxide as same as the case of general formula (1), such as bis(4-hydroxy-cyclohexyl)mathane with 2 moles of ethylene oxide, 2,2-bis (4-hydroxycyclohexyl)-propane with 4 moles of propylene oxide, 3,3-bis(4-hydroxy-cyclohexyl)pentane with 2 moles of butylene oxide. A ratio for addition moles is preferably less than 4 moles of alkylene oxide against 1 mole of bishydroxyl whereas a number of moles of said alkylene oxide is more than 4, the memory shape capability decreases. And then, it is furthermore preferable to use a compound without alkylene oxide addition.

Diol compounds shown in general formula (3) is prepared with cyclohexane dimethanol, or an adduct of alkylene oxide thereto, whereas adding of more than 4 moles of said alkylene oxide decreases memory shape capability. Cyclohexane dimethanol is especially preferred.

As for alkylene oxide adduct as shown in general formula (3), there are, for example, cyclohexane dimethanol with 2 moles of ethylene oxide, cyclohexane dimethanol with 2 moles of propylene oxide.

In addition, those compounds as shown in the general formulae (1), (2) and (3), can be used as a mixture of more than two compounds.

Referring to the ring component in said polyurethane derivered from the compound shown in general formulae (1), (2) and (3), at least about 15% by weight, preferably more than about 20% by weight, or more preferably more than about 25% by weight comprises at least one said ring component shown as follows,

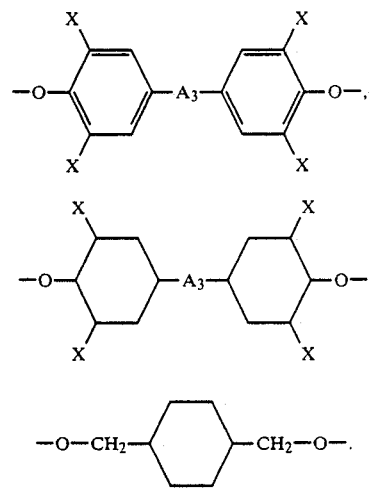

When a content of the above ring component are less than about 15% by weight, memory shape capability decreases. Furthermore, in the case of thermosetting polyurethane to be prepared, at least about 80% by equivalent weight and more preferably about 85% by equivalent weight of polyol as shown in the general formulae (1), (2), and (3) are contained in total polyol component.

In order to improve other capability such as impact resistance, or low temperature resistance, a combined use of polyol component shown in general formulae (1), (2) and (3), [to be indicated as (b1)] and long chain polyol of molecular weight 500~8000(determined by OH-V in polyol) [to be indicated as (b2)] is suitable.

Represented by (b2), are polyetherdiol, polyesterdiol, polybutadiene glycol, hydrogenerated polybutadiene glycol, and a mixture of more than two of these.

As for polyetherdiols, for example, there are polyethylene etherglycol, polypropylene etherglycol, polyethylene-polypropylene (block copolymer and/or random copolymer) etherglycol, polytetramethylene etherglycol, polytetramethylene-ethylene (block copolymer and/pr random copolymer) etherglycol, polytetramethylenepropylene (block copolymer and/or random copolymer) etherglycol, polyhexamethylene etherglycol, and mixtures of more than two of abovementioned.

As for polyesterdiols, for example, polyesterdiol obtained as a result of reaction of low molecular weight diols and/or polyetherdiol with less than molecular weight 1000, with dicarboxylic acid, polylactonediol obtained as a result of ring opening polymerization of lactone and polycarbonatediol.

Low molecular weight diol is represented by ethylene glycol, diethylene glycol, propylene glycol, dipropylene glycol, 1,4-butanediol, 1,3-butanediol, neopentyl glycol, 1,6-hexanediol, and mixtures of more than two of abovementioned.

Polyetherdiol of less than molecular weight 1000 is represented by polyethylene glycol, polytetramethylene glycol, polypropylene glycol, triethylene glycol, and mixtures of more than two of abovementioned.

Dicarboxylic acid is represented by aliphatic dicarboxylic acids (such as succinic acid, adipic acid, sebacic acid, glutaric acid, azelaic acid, maleic acid, fumaric acid), aromatic dicarbonic acids (such as terephthalic acid, isophthalic acid), and mixtures of more than two types of the above. A suitable lactone compound is ε-caprolactone.

For examples of said polyesterdiol, there are polyethylene adipate, polybutylene adipate, polyhexamethylene adipate, polyneopentyl adipate, polyethylene-propylene adipate, polyethylenebutylene adipate, polybutylene-hexamethylene adipate, polydiethylene adipate, poly(polytetramethylene ether) adipate, polyethylene azelate, polyethylene sebacate, polybutylene azelate, polybutylene sebacate, polycaprolactonediol, and mixture of more than two of abovementioned.

As for polybutadiene glycols, it is suitable to select such as hydroxyl terminated polybutadiene homopolymer type, hydroxyl terminated polybutadiene copolymer type (styrene-butadiene copolymer, acrylonitrylbutadiene copolymer), and mixture of more than two types of those. Poly Bd Series (ARCO, USA) and NISSO-PB-G Series (Nippon Soda Co., Ltd, Japan) are applied instance of the above.

For hydrogenated polybutadiene glycol, it is suitable to select a compound which is hydrogenerated partially or totally to unsaturated double bond of abovementioned polybutadiene glycol, and mixtures of those. Applied example is GI Series of NISSO-PB (Nioppon Soda Co., Ltd, Japan).

Also, polymer polyol prepared by a process of polymerization of unsaturated ethylenic monomers (acrylonitrile, styrene, etc.) in the presence of long chain diol, can be selected.

In order to improve other capability of polyurethane obtained by this invention, such as impact resistance, or low-temperature resistance, except memory shape, can be improved by using (b1), together with low-molecular weight polyols (to be indicated as (b3) with less than average molecular weight of 400,(molecular weight determined by OH-V of polyol component).

(b3) represents the following; ethylene glycol, diethylene glycol, propylene glycol, diproplylene glycol, 1,3-butanediol, 1,4-butanediol, neopentyl glycol, 1,6-hexanediol, glycerin, trimethylol propane, pentaerythritol, and mixtures of more than two of those. In addition to the abovementioned, polyamines such as monoethanolamine, diethanolamine, hexamethylenediamine, diethylenetriamine, isophorondiamine, 4,4'-diphenylmethanediamine, 4,4'-methylenebis(cyclohexylamine), and mixtures of more than two types of those, can be used in the same way as (b3) in the extent not to cause impairing the memory shape characteristics.

In some process of preparing said polyurethane resin, a certain catalyst is needed, such as metallic salts of organic or inorganic acids and organometallic derivatives for instance lead-octoate, dibutyltindilaurate, stannousoctoate; organic tertiary amines for instance triethylenediamine, triethylamine; diazabicycloundecene and its derivatives.

For the process and production of said polyurethane resin, and moldings thereof, some auxiliary agents can be blended providing that they do not impair the memory shape property. It is such as color like dye or pigment, filler, modifier, stabilizing agent for weather, plasticizer, cross-linker.

As for color, there are dyes such as direct dyes, acid dyes, basic dyes, reactive dyes, metallic complex salt dyes, : inorganic pigments, such as carbon black, titanium oxide, iron oxide, chromium oxide, mica, zinc oxide, Prussian blue, : and organic pigments such as coupling azo pigments, condensed polyazo pigments, anthraquinone pigments, perylene pigments, quinacridone pigments, thioindigo pigments, dioxazine pigments, phthalocyanine pigments.

As for fillers, there are inorganic fillers, such as calcium carbonate, silica, talc, glass beads. And as organic fillers, they are fine powder, beads, or hollow beads of fluoro resin, silicone resin, polyamide resin, polystyrene resin, and urethane resin.

As for organic modifiers, there are thermoplastic resins, such as polyvinyl chloride, polyacrylate, polystyrene, polyacrylonitrile, acrylonitrile-vinylidenechloride copolymer, acrylonitrile-styrene copolymer, and vinylchloride-vinylacetate copolymer.

As for stabilizing agent for weather, there are antioxidants such as hindered phenols, phosphates, thioethers; ultraviolet ray absorbents such as benzophenones, benzotriazoles, oxalicbisanilid, salicylates; light stabilizers such as hindered amines, : NOx gas stabilizers such as hydrazines, semicarbazides, : metal inactivators such as nickel complex salts, : flame-retardants such as organic halides.

As for plasticizer, dibutyl phthalate and dioctyl phthalate are applied.

As for crosslinker it is selected from the isocyanate previously mentioned, melamine, organic plyamine, ketimine derivered from organic polyamine combined with ketone such as methyl ethyl ketone; a polyfunctional glycols such as trimethylol propane and glycerine; epoxy compounds.

The ratio of the compound (b1), (b2) and/or (b3) in the process of producing thermoplastic polyurethane resin can be changed according to functional needs such as the memory shape characteristics or others for the polyurethane resin with memory shape as long as the polyurethane resin has at least about 15 weight %, preferably more than about 20 weight %, or more preferably more than about 25 weight % of the ring component as shown in the following figure derivered from compound (b1).

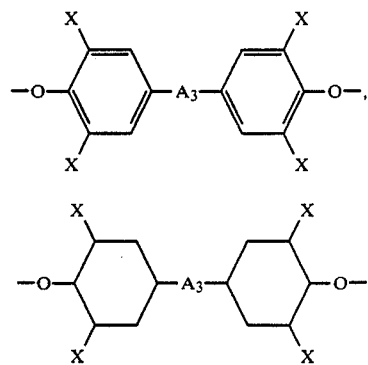

-continued

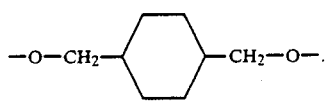

In the case of preparing thermoplastic polyurethane with memory shape, the mole ratio of polyol compound (b1) to compound (b2) and/or (b3) being used jointly, i.e. [(b1):{(b2)+(b3)}], suitably 1:0~1, and preferably 1:0~0.5. The equivalent ratio of NCO radical in organic polyisocyanate (I) to active hydrogen of all polyol compound [to be indicated as (B)] comprising (b1), the essential constituent, and either (b2) or (b3) and/or both of them, which react to isocyanate is suitably (isocyanate radical: active hydrogen=)0.9~1.1:1, and preferably 1:1 substantially.

Production of thermoplastic polyurethane characterized with memory shape can be done by the usual methods, such as one-shot method to have compound (I) and whole of compound (B) reacted altogether; or a method of two steps, at first to have compound (I) and a part of compound (B), for instance compound (b2), reacted to obtain prepolymer, and secondly to have this prepolymer reacted to compound (b1).

Also production of thermoplastic polyurethane with memory shape can also be done in a condition where exists a solvent inactive to isocyanate component. In a case of solventless, a method of polymerization using a kneader or an extruder, and after polymerization a method of granulation using a pelletizer or freeze-crusher, can be adopted.

When a solvent is applied for the polymerization process, the following can be used: amide solvent such as dimethyl formamide (called DMF hereafter), dimethyl acetamide, sulfoxide solvent such as dimethyl sulfoxide, lactam solvent such as N-methyl-2-pyrrolidone, ether solvent such as dioxane and tetrahydrofuran, ester solvent such as ethylacetate and cellosolve acetate, ketone solvent such as cyclohexanone, methyl ethyl ketone, and methylisobutyl ketone, aromatic hydrocarbon solvent such as toluene, aliphatic hydrocarbon solvent such as n-hexane, alcohol solvent such as isopropyl alcohol and ethyl alcohol; either any one of above or a mixture of more than two types. Of all those mentioned, amide type and sulfoxide type solvents, especially DMF are more preferable.

The concentration of the polyurethane resin in the above solution is suitably 10~90 weight %, and preferably 20~60 weight %.

The thermoplastic articles with memory shape of polyurethane resin can be molded in commonly known methods for solvent free such as injection molding, extrusion molding, blow molding, inflation process, and calender process, at temperature 100~250° C. In the case where the thermoplastic polyurethane resin is supplied as the abovementioned solution, a method that the solvent component in the solution is to be evaporated after being poured and spread with a doctor knife over release paper, metal board, glass plate, or plastic film, can be adopted. It is easy to adjust the suitable concentration of the resin for the molding. Ordinary temperature for this process is 60~200° C.

This invention enables the thermoplastic article with memory shape to memorize a desired shape as an original shape by maintaining the thermoplastic article in the desired shape at the temperature of 130~230° C. during suitably one minute~20 hours, preferably five minutes~10 hours. Those articles can be reshaped into desired form below about 130° C., and be locked in the reshaped form below about 40° C. When said reshaped article is heated at higher than about 40° C., the article can revert back to the original shape.

Because of this specificity mentioned above, said thermoplastic article characterized with memory shape comprising the polyurethane resin disclosed in this invention is useful for commercial application such as filling material and sealing compound material for building, decorative articles, medical articles, coating materials of pipes and tubes, couplings for piping, fixing pins, fasteners, thermo-sensors, sealant for wiring, mold articles, reshaping toys, accessories, packing material, tapes, artificial-flowers, component of automobiles such as bumpers, sealant for automobile machineries, electronic housing materials, interlinings for clothing.

Preparing of the porous sheet characterized with memory shape comprising the polyurethane resin disclosed in this invention can be done by following methods.

One of them is that it is first step to prepare prepolymer by reaction of compound (I) and compound (b2), and next step to add foaming agent (such as 2,2'-azobisisobutyronitrile, azodicarbonamide) and component (b1) blended with foam stabilizer [such as silicone oil (SH series: Toray Silicone Co., Japan)], and then finally to be made foams and cure the product.

Another method is to prepare said polyurethan sheet by at first to compound the thermoplastic polyurethane resin with memory shape in which a solvent has low solubility to the polyurethane resin and lower boiling point than water, then next, to convert the phase of the polyurethane resin by addition of water and to make it W/O type emulsion, and thereafter, to evaporate the solvent, finally to dry water and then to leave said porous sheet.

Preparing the porous sheets with memory shape disclosed in this invention, the organic solvent, in the polyurethane solution which is prepared in the same process as in the case of thermoplastic polyurethane with memory shape, or in the same organic solution used in urethane reaction with pelette and or powder, especially DMF is preferable, can be used to dilute or dissolve to the extent the concentration, this concentration is suitably 5~40, preferably 15~20 weight%, and if necessary, the auxiliary-compounding agents abovementioned, surface active agent (anion type, cation type, nonion type, silicones, etc.), and porous film-making improver in wet process (cellulose powder, etc.) can be added.

For the purpose of giving heat resistance to the porous sheet, a cross-linking agent: aromatic polyisocyanate, such as CORONATE L, (Nippon Polyurethane Ind. Co., Ltd., Japan) or aliphatic polyisocyanate, such as CORONATE HL (Nippon Polyurethane Ind. Co., Ltd., Japan), can be mixed.

There are two methods of producing the porous sheet: first one is the method of coating or impregnating the aforesaid mixed solution on a support or a substrate by a doctor knife at first, then putting it in the coagulation bath filled with a non-solvent which is miscible with the organic solvent but immiscible with the polyurethane resin, and extracting the solvent to coagulate and to leave the product; the other one by coagulating the compound under the vaporized non-solvent and putting it in the coagulation bath filled with the non-solvent, and extracting the solvent to obtain the product.

The non-solvent as mentioned above which is soluble with the organic solvent but non-soluble with polyurethane resin, are water, methanol, ethylene glycol, and glycerin etc. In general case, water is used. Aqueous solution of DMF which has low concentration also can be used.

For manufacturing of porous sheet by this invention, the following are used as the substrate: woven, non-woven, or knitted fabrics, felt, and napped cloth made from all kinds of natural or synthetic fibers (polyamide, polyester, rayon, wool, cotton, etc. and combination of those materials), : papers, : the above fabrics to which said polyurethane resin solution is coated or impregnated, : spongy articles made of polyurethane and vinylchloride, : the same one on which polyurethane resin, polyamide resin, or polyvinylchloride is applied to coat.

For support being used for manufacturing said porous sheets in this invention, the following are used: various kinds of plastic films, metal boards, glass plates, etc.

The porous sheet obtained by this invention forms not only flat sheet with substrate, or the polyurethane resin sheet separated from metal board, plastic film, but also forms in cylinder or half sphere or mixed shape of those.

The other specification of said porous sheet in this invention is as follows: it is articles in sheet shape made from the urethane resin having closed micro cells or open micro cells and suitable apparent density is about $0.2 \sim 0.95$ (g/cm$^3$), or articles the same above but composed with the substrate. The preferable apparent density of said porous sheet is about $0.3 \sim 0.8$ (g/cm$^3$), because when such apparent density is higher, moisture permeability is decreased, and on the other hand, when the apparent density becomes lower, strength becomes weak and thermal conductivity is decreased and speed of locking and reversion slows down.

This invention enables the porous sheet characterized with memory shape to memorize a desired shape as an original shape formed by maintaining the porous sheet in the desired shape at the temperature of $130 \sim 230°$ C. during suitably one minute $\sim 20$ hours, preferably five minutes $\sim 10$ hours. Those porous sheet can be reshaped into another desired form below about $130°$ C., and be locked in the reshaped form below about $40°$ C. When said reshaped porous sheet is heated at higher than about $40°$ C., the porous sheet can revert back to the original shape.

Because of such specificity of the porous sheet with memory shape, obtained by this invention, it is useful for manufacturing of interlining of clothing, brassier, corset, medical plaster cast, medical tool, protector for sports, toys, artificial flowers, etc.

For manufacturing the paint composition with healable characteristics comprising the polyurethane resin disclosed in this invention, the method of preparing the comprised polyurethane resin in the paint composition is same as the abovementioned polyurethane resin preparing for the thermoplastic article with memory shape.

In an process for blending of the paint composition, the polyurethane resin with memory shape obtained by abovementioned method can be mixed with a diluent and auxiliary compound. Such diluent used in the process of porous sheet may be used for this process, together with auxiliary compound mentioned previously.

The composition of paint obtained by this invention can be blended the following compounds:
(%=weight %)
  polyurethane with memory shape: $3 \sim 100\%$, preferably $50 \sim 100\%$
  diluent: $0 \sim 95\%$, preferably $0 \sim 90\%$,
  dye: $0 \sim 10\%$, preferably $0 \sim 5\%$
  pigment: $0 \sim 40\%$, preferably $0 \sim 30\%$,
  inorganic filler: $0 \sim 40\%$, preferably $0 \sim 30\%$,
  modifier: $0 \sim 10\%$, preferably $0.1 \sim 5\%$,
  plasticizer: $0 \sim 30\%$, preferably $0 \sim 10\%$,
  cross-linking agent: $0 \sim 20\%$, preferably $0 \sim 10\%$.

The paint disclosed by this invention can be painted on the surface of metals (iron, aluminium, stainless steel, etc.), plastic (polyurethane resin, acryl resin, modified polyphenylene oxide resin, vinyl resin, polypropylene resin, polycarbonate resin, polyamide resin, ABS resin, PBT resin, etc.), concrete, building stone, lumber, paper, textile, leather (natural leather, synthetic leather, artificial leather, etc.) and so on.

The method of painting or coating is as follows: soaking, brushing, spray coating, bar coating, roll coating, knife coating, gravure coating, etc. There is a particular method wherein coating on release paper is transferred on an article to be painted. Drying is done ordinarily at $30 \sim 150°$ C. for $1 \sim 10$ minutes, in some cases, at $30 \sim 180°$ C. for $1 \sim 30$ minutes further. The curing in the presence of cross-linking agents is done at $30 \sim 100°$ C. for $1 \sim 48$ hours.

The thickness of coating or painting is suitably $5 \sim 1000$ microns after dried up, but preferably $10 \sim 500$ microns. The thickness decreased less than 5 microns is bound to crack often and not sufficiently healable capability. The coating in excess 1000 microns thick, however, do not add more healable capability while it would rather show demerits economically.

The paint coating of this invention is quite significant of its healable capability. The marred or stamped surface of this coating can be recovered to its intact state visually when heated at above about $40°$ C., unless material frame of coating itself would be broken. Even a deep mar by a sharp knife unless it doesn't reach to the base under the coating can be recovered to its almost intact state by the aforesaid treatment.

When the thermoplastic or thermoset article characterized with memory shape is applied as the coating article, the healable characteristics of the coating shows its utmost superiority. On the other hand the coating on the metal base is sometimes broken easily, and if the both of the coating and the plastic base are broken it is very difficult to be recovered. When the coating on the above article with memory shape is marred, the healable characteristics of the coating and the memory shape characteristics of the article affect cooperatively by absorbing mars to recover easily with heating treatment.

This characteristic is well utilized for coating on the items easily marred such as vehicles, housing of electronic equipment, leather, furniture, exterior-interior decorations, etc. and also useful in order to make temporal markings with press.

It is specified by this invention that synthetic leather means leather-like articles made of fibrous substrate, the surface of which is coated by non-porous coat comprising mainly of said polyurethane resin.

The polyurethane resin to be used for manufacturing synthetic leathers, can be obtained by the same method as of the case of the thermoplastic polyurethane resin with memory shape.

The process of manufacturing the synthetic leather is to cover a substrate with the solution of abovementioned polyurethane in this invention; as for covering method, impregnating, spraying, applying with doctor knife, gravure painting, transfer method, etc. are adopted.

An ordinary concentration of the polyurethane solution is 3~80 weight %, and preferably 15~50 weight %. The same type of diluent used for polymerization above can be used in this case. Also, the same substrate, used in the case of porous sheet, can be used. In order to obtain the good quality synthetic leathers, a coating film is dried suitably at 80~160° C. for 1~60 minutes to avoid adhering and blocking.

In order to give the synthetic leathers solvent-resisting and heat-resisting properties, the following can be used: polyfuntioctional isocyanate as aromatic polyisocyanate such a CORONATE L (above-mentioned), or aliphatic polyisocyanate such as CORONATE HL, (abovementioned) the products are cured at room temperature ~150° C. for 10 minutes~48 hours suitably.

Overlaying coating of polyurethane resin, polyaminoacid resin, and polyacrylic resin is acceptable for the purpose of adjustment in surface touch of said synthetic leather to the extent not to cause impairing its healable capability.

This invention emphasizes healable capability possessed by the synthetic leather prepared by this invention. By heating the synthetic leather at more than about 40° C., any scratches or imprinted marks on the surface can be recovered visually as same as its original flawless condition. For example, when a scar is not serious enough to damage the substance itself, it will be recovered almost completely, and a cut made by a knife which is not deep enough to reach to the bottom of the coating film, can be recovered to be inconspicuous.

For its specificity abovementioned, said synthetic leather is very useful to be applied in manufacturing of vehicles interior material, housing for electronic equipment, shoe material, furniture, building interior materials. It is also made to be imprinted with marks.

Concerning with preparation of the thermoset article characterized with memory shape, in detail for the comprises polyurethane resin, the proportional ratio for main essential compound (b1) and/or compound (b2) and/or compound (b3) can be flexible according to the need for memory shape and/or other specific functions, provided that the minimum proportion is maintained as follows: compound (b1), at least 80% by equivalent weight mol, preferably 85% in total reacted polyol (B), and also 15 weight %, preferably more than 20 weight %, or most preferably more than 25 weight % in the polyurethane resin comprises at least one ring component shown by the following

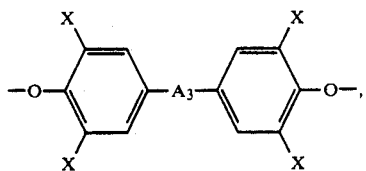

-continued

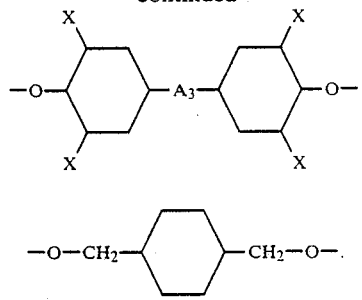

In ordinary cases, equivalent ratio of NCO radical in organic polyisocyanate (I) and to active hydrogen of all polyol compound (B) is (isocyanate radical:active hydrogen=) 0.8~1.4:1 or preferably 0.9~1.3:1. Where the ratio is less than 1.03:1, it is suitable to use tri-functional compound in a part of compound (I) and/or compound (B).

Preparation of polyurethane resin for the thermoset article can be done by ordinary methods, such as one-shot process of simultaneous reaction of compound (I) and compound (B) as a whole; making first product of prepolymer to react compound (I) and a part of compound (B) such as compound (b2), and then to react said prepolymer and the remained compound (b1).

The thermoset article characterized with memory shape can be produced by ordinary methods. Upon preparation of solventless thermoplastic polyurethane pellets, and mixed with crosslinking agent of block-isocyanate, it is molded in a processes of injection, press, blow, inflation, calender, etc. Molding temperature is ordinarily 100~250° C. In a case where the polyurethane resin is prepared with solvent, after mixing with crosslinking agent, the polyurethan solution is poured on the surface of release paper, metal board, glass plate, or plastic film, etc. and remove the solvent by evapolation. In this case, the temperature is kept within 60~200° C.

There is another method of pouring into a mold the mixture of compound (I) and compound (B) made up with prescribed quantity of each compounds. For example, having a prescribed amount of compound (I) and compound (B), heated to 40~120° C., and, if required blended with catalyst, additive, filler, color etc. and after deairated by stirring, the mixture is poured into a mold which is heated to 70~130° C. The all steps of the process like measuring, mixing, or casting, can be done by machines, such as two-component blending-casting machine, sprayer, centrifugal casting machine, RIM, R-RIM, etc. As for mixing of solution, a portion of compound (I) or compound (B) is blended with additive, filler, and/or reinforce fiber to be made two-component, three-component, or four-component which can be separately measured and blended. Any one of these solution can be a foaming agent such as flon gas or air. Also, it is another suitable method that prepolymer obtained by reacting compound (I) and an portion of compound (B) is mixed with the remaining portion of compound (B).

The thermoset article characterized with memory shape produced by this invention can be reshaped into a desired form at lower than about 130° C., and such reshaped form can be locked and maintained without external force, after being cooled down to lower than about 40° C. in such reshaped form. Then said article in a reshaped form can be reverted back to the original shape by being heated to higher than about 40° C.

Because of such useful specificity, the abovementioned article can be applied for filling material for building, sealing compound material for building, decoration material, medical material, coating material for pipes, couplings for piping, fixing pins, fasteners, thermosensors, sealant for wiring, molds, reshapable toys, accessories, packing material, artificial flowers, sealant for automobile machinery, electronics housing, interlinings for clothing.

The example of production methods, casting methods and molding methods which are presented in the above description is not construed to limit the scope of application and specification of those materials and methods of this invention.

This invention will be understood more readily with reference to the following examples; however these examples are intended to illustrate the invention and are not to be construed to limit the scope of the invention.

For the purpose of simplification and illustration reference will be expressed some compound by signs as follows:

(The word "part" means 'part by weight')
[Raw materials used]

| (Sign) | (Compound) |
|---|---|
| 1. Polyisocyanate I | |
| (MDI) | 4,4'-diphenylmethane-diisocyanate |
| (HMDI) | 4,4'-dicyclohexylmethane diisocyanate |
| (HDI Biuret) | polyisocyanate reacting hexamethylene-diisocyanate with water (DURANATE 24A-100, Asahi Chemical Ind., Japan) NCO % = 23.5, solid = 100% |
| (IPDI) | isophorone diisocyanate |
| 2. Polyol component (b1) | |
| (b1-1) | 4,4'-isopropylidene bisphenol ethylene oxide adduct average adduct moles: 2.3 mean molecular weight: 330 hydroxyl value: 340 |
| (b1-2) | 4,4'-isopropylidene bisphenol propylene oxide adduct average adduct moles: 2.3 mean molecular weight: 361 hydroxyl value: 311 |
| (b1-3) | 4,4'-sulfonyl bisphenol ethylene oxide adduct average adduct moles: 2.3 mean molecular weight: 351 hydroxyl value: 319 |
| (b1-4) | 2,2-bis(4-hydroxy cyclohexyl)propane molecular weight: 246 |
| (b1-5) | cyclohexan-dimethanol molecular weight: 144 |
| (b1-6) | 4,4'-isopropylidenebisphenol ethylene oxide adduct average adduct moles: 18.1 mean molecular weight: 1020 hydroxyl value: 110.1 |
| 3. polyol component (b2) | |
| (b2-1) | polybutylene adipate mean molecular weight: 2000 hydroxyl value: 56.1 |
| (b2-2) | polytetramethylene etherglycol mean molecular weight: 2030 hydroxyl value: 55.3 |
| (b2-3) | polycarbonatediol mean molecular weight: 1020 hydroxyl value: 110.0 |
| (b2-4) | polycarbonatediol propylene oxide adduct (molecular weight of polycarbonatediol before addition: 3000) mean molecular weight: 6720 hydroxyl value: 16.7 |
| 4. polyol component (b3) | |
| (b3-1) | ethylene glycol |
| (b3-2) | 1,4-butanediol |
| (b3-3) | thimethylol propane |
| 5. solvent | |
| (DMF) | dimethyl formamide |
| (MEK) | methyl ethyl ketone |
| (MIBK) | methyl isobutyl ketone |
| (EtAC) | ethyl acetate |
| (Tol) | toluene |

EXAMPLE A-1

A Polyurethane resin solution of concentration 30%, of viscosity 560 Poise at a temperature of 20° C. (the ring component derived from compound (b1):39% by weight in the resin) was obtained by reacting 171 parts of (b1-1) and 129 parts of (MDI) in 700 parts of (DMF) at temperature of 80° C. An article in the form of film of 0.2 mm thick was molded by pouring said solution over a glass plate and removing (DMF) by evaporating at 120° C. Then the article was cut into a size of 1 cm by 10 cm, bent by 180-degrees at a temperature of 27° C. and locked in this bent shape. One of this bent article was placed in the water of 80° C., and in less than two seconds, the article reverted back completely to its original shape. Another one of the bent article which kept in the bent shape for a month at a temperature of 30° C., did revert back completely to its original shape when it was placed in the water of 80° C. in less than two seconds.

EXAMPLE A-2

A quasi-prepolymer with isocyanate radical at the ends was obtained after two hours of reaction operation of 2000 parts of (b2-1) with 4604 parts of (MDI) at a constant temperature of 70° C. It was used to obtain a string-shaped article in the process that said quasi-prepolymer and (b1-2) were fed into a metering pump while the compounds were kept at temperatures of 70° C. and 120° C. each and the compounds were sent into a double-axis extruder by pumps at a rate of 100.0 g/minute and 95.2 g/minute respectively, for blending, kneading and reacting continuously in the extruder at the maximum temperature of 200° C. This string-shaped polyurethane resin (the ring component derived from compound (b1):31% by weight in the resin) was cured at 25° C. for 15 hours and after that was pelletized into polyurethane pellets by a pelletizer. The viscosity of (DMF) solution, which represented 30% of the contents of said pellets, was 760 Poise at 20° C.

A film-shaped article of 0.3 mm thick was molded from said pellets by processing with a calender-roll which was heated to 190° C. The film-shaped article was, then, cut into a size of 1 cm by 10 cm, bent by 180 degrees at 80° C., and locked in such shape by cooling down 25° C. When one of the bent-shaped article was placed in the water of 80° C., in less than two seconds it reverted back completely to the original shape. Another one of the bent-shaped article which kept in the bent shape at 25° C. for a month did revert back completely to the original shape in less than two seconds when it was placed in warm water of 80° C.

EXAMPLE A-3

A polyurethane resin solution, with 30% concentration (the ring component derived from compound (b1):32% by weight in the resin) which viscosity was 820 Poise at a temperature of 20° C., was obtained by reacting 136.2 parts of (b1-3), 27.3 parts of (b2-2), 7.2 parts of (b3-1), and 129.3 parts of (MDI), in 700 parts of (DMF) at 80° C.

This solution was used to mold a film of 0.2 mm thick by coating a glass plate, then by removing (DMF) which was evaporated at a temperature of 120° C. This film was cut into a size of 1 cm by 10 cm, and was bent by 180 degrees at a temperature of 27° C., then the bent shape was locked in.

One of this film was placed in the water of 80° C., then it reverted back completely to the original shape in less than two seconds. Another piece of said film, which kept in a bent shape for a month at 25° C., was placed in the water of 80° C., then it reverted back completely to the original shape in less than two seconds.

EXAMPLE A-4:

A polyurethane resin solution contained 30% concentration of polyurethane, of viscosity 560 Poise at the temperature of 20° C. (the ring component derived from compound (b1):40% by weight in the resin) was prepared by reacting 122.2 parts of (b1-4) and 38 parts of (b2-3) with 139.9 parts of (HMDI) in 700 parts of (DMF) including 0.1 part of dibutyltindilaurate (catalyst), at the temperature of 80° C.

By coating a glass plate with said polyurethane solution and removing (DMF) which was evaporated at a temperature of 120° C., a film-shaped article of 0.2 mm in thickness was obtained. The film-shaped article, in a size of 10 cm by 1 cm, was bent by 180 degrees at 27° C. One of this article was placed in the water of 80° C., then it reverted back completely to the original shape in less than two seconds. Another one of this article which kept in a bent shape for a month at 25° C., reverted back completely to the original shape in less than two seconds after it was placed in warm water of 80° C.

EXAMPLE A-5:

The same method as described in Example A-2 was used to obtain quasi-prepolymer by reacting 672 parts of (b2-4) and 4567 parts of (MDI). This quasi-prepolymer and (b1-5) were, while being kept at temperatures of 70° C. and 120° C. each, feeded into a double-axis extruder by a metering pump, at a rate of 100 g/minute and 49.4 g/minute each, for blending and kneading together at the maximum temperature of 200° C., while reacting continuously in the extruder which sent out a string-shaped article, which was cured at 25° C. for 15 hours.

The article, then was cut by a pelletizer to form polyurethane pellets (the ring component derived from compound (b1):33% by weight in the resin). The viscosity of said pellets 30% in (DMF) solution was 620 Poise at 20° C. The pellets was used to make a sheet-shaped article of 3 mm in thickness by processing said pellets with injection molding machine (cylinder temperature 200° C.; resin temperature 215° C.; injection pressure 80 kg/cm$^2$). A piece of said sheet in the size of 1 cm by 10 cm, was bent by 180 degrees at a temperature 80° C., and being kept in such a shape, was cooled down to 25° C. to be locked in the shape.

This article was placed in the water of 80° C., and in less than one minutes, it reverted back to the original shape. Another piece of said sheet which kept in such shape at 25° C. for a month, reverted back completely to the original shape when it was placed in warm water of 80° C. in less than one minute.

EXAMPLE A-6:

A polyurethane solution (the ring component derived from compound (b1):37% by weight in the resin), of 30% polyurethane concentration, with viscosity 560 Poise at 20° C., obtained by reacting 162 parts of (b1-1) and 4 parts of (b3-2) with 134 parts of (MDI) in 700 parts of (DMF) at a temperature of 80° C. The obtained polyurethane solution was used to make a film-shaped article of 0.2 mm thickness by coating a glass plate with said solution and then removing (DMF) which evaporated at a temperature of 120° C. The film-shaped article was then cut in the size of 1 cm by 10 cm, and was bent by 180 degrees at 27° C..

It was placed in warm water of 80° C., then it reverted back completely to the original shape in less than two seconds. Another piece of said article, which kept in a bent shape at a temperature of 25° C. for a month, reverted back completely to the original shape in less than two seconds when it was placed in warm water of 80° C.

EXAMPLES A-7, A-8, A-9:

The each film-shaped articles in the size of 1 cm by 20 cm, obtained in Examples A-1, A-2, and A-3, were attached to glass sticks (10 mm in diameter) by winding each piece around a glass stock to form a coil, and fixing both ends with strings and they were heated at a temperature of 150° C. for thirty minutes, then cooled down to 25° C., when the articles were taken off the glass sticks.

The articles in the coil-shape kept their shape at 25° C. for ten days after the treatment. After ten days, they kept the same coil shape. Then they were reshaped into a flat shape by being heated at 80° C. and locked in the reshape by cooling down to 25° C. After more ten days, the reshaped articles kept in such a shape, then they were placed in the water of 80° C., in less than two seconds they reverted back to their coiled shape.

The results of those treatments are illustrated in Table-1.

TABLE 1

|  | EXAMPLE A-7 | EXAMPLE A-8 | EXAMPLE A-9 |
| --- | --- | --- | --- |
| Tested Article and shape | Example A-1 Flat shape | Example A-2 Flat shape | Example A-3 Flat shape |
| Temperature of heat treatment (°C.) | 150 | 150 | 150 |
| Observed shape kept at 25° C. for 10 days after heat treatment | Coiled shape maintained | Coiled shape maintained | Coiled shape maintained |
| Observed reshape kept at 25° C. for 10 days after locking | Flat shape maintained | Flat shape maintained | Flat shape maintained |
| Observed reshape after bathing at 80° C. | Reversion to coiled shape after 2 seconds | Reversion to coiled shape after 2 seconds | Reversion to coiled shape after 2 seconds |

COMPARATIVE EXAMPLE Ac-1

By reaction of 1423 parts of (b2-1) and 1072 parts of (MDI) at a temperature of 70° C. for two hours, a quasi-prepolymer with isocyanate radicals at the ends was obtained. By mixing 253 parts of (b1-1) and 253 parts of (b3-2) at 120° C. till the mixture homogenized, a solution named (B) was obtained. Then by a metering pump, the quasi-prepolymer and the solution (B), while being kept at 70° C. and 120° C. respectively, were feeded into a double axis extruder at a rate of 100 g/minute and 20.2 g/minute each through a mixer, for blending and kneading while reacting continuously at a maximum temperature of 200° C., to be formed into a string-like shape. The string-shaped article, then was cured at a temperature of 25° C. for 17 hours. After being cured, the article was cut by a pelletizer to form polyurethane pellets (the ring component derived from compound (b1):6% by weight). The viscosity of a (DMF) solution of 30% concentration of the pellets was 730 Poise at 20° C.

By processing the pellets with a calender-roller which was heated to 190° C. an article in a film-shape of 0.3 mm thick was obtained. After being cut to the size of 1 cm by 10 cm, such a piece was bent by 180 degrees to be left in such a shape. However, it reverted back to the original shape so soon that it could not be locked in the bent shape.

COMPARATIVE EXAMPLE Ac-2:

By reacting 87.1 parts of (b1-6), 87.1 parts of (b2-2), and 18.6 parts of (b3-1) with 107.1 parts of (MDI) in 700 parts of (DMF) at a temperature of 80° C., polyurethane resin solution (the ring component derived from compound (b1):6% by weight in the resin), of 840 Poise viscosity at 20° C., was obtained. A film-shaped article of 0.2 mm thick was made from said solution by coating a glass plate and removing (DMF) which evaporated at a temperature of 120° C.

The article, cut to the size of 1 cm by 10 cm, was then bent by 180 degrees at 80° C., and was to be locked in such a shape while being cooled down to 25° C., but did not respond with the treatment as it reverted back to the original shape instantly.

COMPARATIVE EXAMPLE Ac-3:

A polyurethane solution of 30% resin concentration, viscosity 810 Poise at 20° C. (no compound (b1)), was obtained by reacting 160.1 parts of (b2-4), and 25.6 parts of (b3-1) with 114.3 parts of (HMDI) in 700 parts of (DMF) at a temperature of 80° C. By coating a glass plate with this solution and removing (DMF) which evaporated at 120° C. a film-shaped article of 0.2 mm thickness was obtained.

The article which was cut to the size of 1 cm by 10 cm, was bent by 180 degrees at 25° C. The bent article was to be locked in that shape, but it reverted back to the original shape instantly.

EXAMPLE B-1:

The solution of polyurethane resin (the ring component derived from compound (b1):39% by weight in the resin) prepared in Example A-1, was blended to prepare the following solution as shown in Table-2.

TABLE-2

| Polyurethane resin solution | 100 parts |
| --- | --- |
| (DMF) | 150 parts |
| SANMORIN OT-70 (*1) | 2 parts |

(*1): Surface active agent (Sodium dioctylsulfo succinate). (Sanyo Chemical Ind., Japan)

A porous sheet article was obtained by coating said solution on a support (polyester film) in 1.5 mm thickness, and leaving this coated film in the water of 30° C. for 60 minutes to coagulate, and then was placed in the water of 60° C. for 60 minutes to wash. The whole thing was then dried at a temperature of 120° C. for 40 minutes (density of the sheet: about 0.4 g/cm$^3$) and a porous sheet was peeled off the polyesther film.

This porous sheet, cut to the size of 1 cm by 10 cm, was bent by 180 degrees at 80° C. and cooled down to 25° C. to be locked in the bent shape. When the porous sheet was placed in the water of 90° C., in less than 30 seconds this porous sheet reverted back completely to the original shape. A separate piece of the same, which was kept in the bent shape at 30° C. for a week, was placed in the water of 90° C., this piece reverted back completely to the original shape in less than 30 seconds.

EXAMPLE B-2:

The polyurethane pellets (the ring component derived from compound (b1):31% by weight), obtained in Example A-2, were used to prepare the solution, which contained the following as illustrated in Table-3:

TABLE-3

| Polyurethane resin pellets | 30 parts |
| --- | --- |
| (DMF) | 220 parts |
| SANMORIN OT-70 | 2 parts |
| DILAC COLOR (*2) | 6 parts |

(*2): Color, (Dainippon Ink and Chemicals Inc., Japan)

The abovementioned solution was coated to a support (polyester film) to the thickness of 1.5 mm, to coagulate for five minutes under the atmosphere that the constant temperature of 40° C. and humidity of 95%RH existed. Thereupon this coat and support were placed in the water of 70° C. for 100minutes to be washed, after which they were dried at 120° C. for 40 minutes, and the obtained porous sheet (density:about 0.5 g/cm$^3$) was peeled off the support film.

The porous sheet which was cut to the size of 1 cm by 10 cm was bent by 180 degrees at a temperature of 80° C. then cooled down to 25° C. to lock in the bent shape. And then, this bent sheet was placed in the water of 80° C., the sheet reverted back completely to the original shape in less than 30 minutes. A separate porous sheet, which kept such bent shape for a week at a room temperature (about 30° C.), was placed in the water of 80° C. and it reverted back completely to the original shape in less than 30 minutes.

EXAMPLE B-3:

The solution of polyurethane resin (the ring component derived from compound (b1):32% by weight), obtained in Example A-3, was blended to prepare the following solution as shown in Table-4.

TABLE-4

| Polyurethane resin solution | 100 parts |
| --- | --- |
| (DMF) | 150 parts |
| SANMORIN OT-70 | 2 parts |

TABLE-4-continued

| CORONATE HL (*3) | 3 parts |
|---|---|

(*3): Aliphatic polyfunctional isocyanate (Nippon Polyurethane Ind. Co., Ltd., Japan)

This solution was coated on a support (polyester film) for the thickness of 1.5 mm, and placed it in the water of 30° C. for 30 minutes until the solution on the support coagulated, then placing the same in hot water of 70° C. for 100 minutes to wash. After drying at a temperature of 120° C. for 40 minutes, the obtained porous sheet article (sheet density:about 0.5 g/cm$^3$) was released from the support.

This porous sheet was cut to the size of 1 cm by 10 cm, was bent by 180 degrees at 25° C. The piece of this bent porous sheet reverted back completely to the original flat shape in less than 30 seconds after it was placed in the water of 70° C. Another piece of the same sheet, which kept such bent shape for a week at a temperature 25° C., did revert back completely to the original shape in less than 30 seconds after it was placed in the water of 70° C.

EXAMPLE B-4:

The solution of polyurethane resin (the ring component derived from compound (b1):40% by weight) obtained in Example A-4, was blended to prepare the solution shown in Table-5 as follows:

TABLE-5

| Polyurethane resin solution | 100 parts |
|---|---|
| (DMF) | 150 parts |
| SANMORIN OT-70 | 2 Parts |

A substrate (polyester raised fabric) was placed and impregnated in the abovementioned solution. Next, the impregnated substrate were kept in the atmosphere at a temperature of 40° C. and humidity of 95%RH while coagulated for five minutes, then it was placed in hot water at 70° C. for 120 minutes. After washing, it was dried at first at a temperature of 80° C. for 20 minutes, and next at a temperature of 120° C. for 40 minutes. A porous sheet (sheet density:about 0.7 g/cm$^3$) was obtained.

This porous sheet in the size of 1 cm by 10 cm was bent by 90 degrees at 65° C., and was cooled down to 20° C. to be locked in the reshape. When this sheet was heated by a dryer to a temperature of 70° C., it was reverted back completely to the original shape in less than two minutes. A separate piece of the same sheet which kept in the bent shape at 25° C. for a week, was reverted back completely to the original shape in less than two minutes when it was heated by a dryer to a temperature of 70° C.

EXAMPLE B-5:

Polyurethane resin pellets (the ring component derived from compound (b1):33% by weight) obtained in Example A-5, were blended to prepare a solution shown in the Table-6 as follows:

TABLE 6

| Polyurethane resin pellets | 30 parts |
|---|---|
| (DMF) | 220 parts |
| SANMORIN OT-70 | 2 parts |
| DILAC COLOR | 6 parts |

After coating the abovementioned solution on a substrate (polyester fabric) in 1.2 mm thickness, placed the substrate in the water of 30° C. for 30 minutes until the solution coagulated, then bathed it in the water of 70° C. for 80 minutes to wash. It was dried at 120° C. for 40 minutes to become a porous sheet (sheet density: about 0.5 g/cm$^3$).

This porous sheet cut to the size of 1 cm by 10 cm, was bent by 180 degrees at a temperature of 80° C. and cooled down to 25° C. to be locked in such shape. When it was placed in the water of 80° C., it was reverted back completely to the original shape in less than two minutes. Another piece of the same sheet, which kept in the bent shape at a temperature of 25° C., even after a month, was reverted back completely to the original shape in less than two minutes when it was placed in the water of 80° C.

EXAMPLE B-6:

The solution of the polyurethane resin (the ring component derived from compound (b1):37% by weight), obtained in Example A-6, was blended to prepare a solution shown in the Table-7.

TABLE-7

| Polyurethane resin solution | 100 parts |
|---|---|
| (DMF) | 150 parts |
| SANMORIN OT-70 | 2 parts |
| CORONATE HL | 3 parts |

The aforementioned solution applied to coat a substrate (polyester raised fabric) by 1.2 mm thick was placed in the water of 30° C. for 30 minutes until the solution coagulated, then was soaked in the water of 70° C. for 120 minutes to wash. After this article was dried at a temperature of 120° C. for 40 minutes, a porous sheet (sheet density:about 0.5 g/cm$^3$) was obtained.

The porous sheet, cut to the size of 1 cm by 10 cm, was bent by 180 degrees at a temperature of 80° C., and was locked in the bent shape by cooling down to 25° C. This reshaped article was placed in the water of 80° C. and it reverted back completely to the original shape in less than two minutes. Another porous sheet of the same size, also in the bent shape, was left at a temperature of 25° C. for a month, which maintained such shape, reverted back completely to the original shape in less than two minutes when it was placed in the water of 80° C.

EXAMPLES B-7, B-8, B-9:

The each porous sheets in the size of 1 cm by 20 cm, obtained in Examples B-1, B-2, and B-5, were attached to glass sticks by winding each piece around a glass stick to form a coil, and fixing both ends with strings and they were heated at a temperature of 150° C. for thirty minutes, then cooled down to 25° C., when the articles were taken off the glass sticks.

The porous sheets in the coil-shape kept their shape at 25° C. for ten days after the treatment. After ten days, they kept the same coil shapes. Then they were reshaped into a flat shape by being heated at 80° C. and locked in the reshape by cooling down to 25° C. After more ten days, the reshaped porous sheets kept in such a shape, then they were placed in the water of 80° C., in less than two minutes they reverted back to their coiled shape.

The results of those treatments are illustrated in Table-8.

TABLE-8

| | EXAMPLE B-7 | EXAMPLE B-8 | EXAMPLE B-9 |
|---|---|---|---|
| Tested Article and shape | Example B-1 Flat shape | Example B-2 Flat shape | Example B-5 Flat shape |
| Temperature of heat treatment (°C.) | 150 | 150 | 150 |
| Observed shape kept at 25° C. for 10 days after heat treatment | Coiled shape maintained | Coiled shape maintained | Coiled shape maintained |
| Observed reshape kept at 25° C. for 10 days after locking | Flat shape maintained | Flat shape maintained | Flat shape maintained |
| Observed reshape after bathing at 80° C. | Reversion to coiled shape after 2 minutes | Reversion to coiled shape after 2 minutes | Reversion to coiled shape after 2 minutes |

COMPARATIVE EXAMPLE Bc-1:

Polyurethane resin pellets (the ring component derived from compound (b1):6% by weight) obtained in Example Ac-1, were blended to prepare a solution shown in the Table-9 as follows:

TABLE-9

| Polyurethane resin pellets | 30 parts |
|---|---|
| (DMF) | 220 parts |
| SANMORIN OT-70 | 2 parts |
| DILAC COLOR | 6 parts |

The abovementioned solution was coated to a support (polyester film) to the thickness of 1.5 mm, and was coagulated for five minutes under the atmosphere of the constant temperature of 40° C. and humidity of 95%RH. Thereupon this coat and support were placed in the water of 70° C. for 100 minutes to be washed, after which they were dried at 120° C. for 40 minutes, and the obtained porous sheet (density:about 0.6 g/cm³) was peeled off the sapport film.

The porous sheet which was cut to the size of 1 cm by 10 cm was bent by 180 degrees at a temperature of 80° C. then was cooled down to 25° C. and was tried to lock in the bent shape. However, it could not be locked in the bent shape but reverted back immediately.

COMPARATIVE EXAMPLE Bc-2:

The solution of polyurethane resin (the ring component derived from compound (b1):6% by weight), obtained in Comparative Example Ac-2, was blended to prepare the following solution as shown in Table-10.

TABLE-10

| Polyurethane resin solution | 100 parts |
|---|---|
| (DMF) | 150 parts |
| SANMORIN OT-70 | 2 parts |
| CORONATE HL | 3 parts |

This solution was coated on a support (polyester film) for the thickness of 1.5 mm, and placed it in the water of 30° C. for 30 minutes until the solution on the support coagulated, then placing the same in water of 70° C. for 100 minutes to wash. After drying at a temperature of 120° C. for 40 minutes, the obtained porous sheet (sheet density: about 0.7 g/cm³) was released from the support.

This porous sheet was cut to the size of 1 cm by 10 cm, was bent by 180 degrees at 25° C. However, it could not be locked in the bent shape but reverted back immediately.

COMPARATIVE EXAMPLE Bc-3:

The solution of polyurethane resin (no ring component derived from compound (b1)) obtained in Comparative Example Ac-3, was blended to prepare the solution shown in Table-11 as follows:

TABLE-11

| Polyurethane resin solution | 100 parts |
|---|---|
| (DMF) | 150 parts |
| SANMORIN OT-70 | 2 parts |

A substrate (polyester raised fabric) was placed and impregnated in the abovementioned solution. Next, the impregnated substrate were kept in the atmosphere at a temperature of 40° C. and humidity of 95%RH while coagulated for five minutes, then it was placed in water at 70° C. for 120 minutes to be washed. Then it was dried at first at a temperature of 80° C. for 20 minutes, and next at a temperature of 120° C. for 40 minutes. A porous sheet (sheet density:about 0.4 g/cm³) was obtained.

This porous sheet in the size of 1 cm by 10 cm was bent by 90 degrees at 65° C., and was cooled down to 20° C. for to lock in this bent shape. However, it could not be locked in the bent shape but reverted back immediately.

EXAMPLE C-1:

A polyurethane resin (the ring component derived from compound (b1):38% by weight) solution was obtained by reacting 167.2 parts of (b1-1) and 132.8 parts of (HMDI) in the mixture of 100 parts of (DMF) and 600 parts of (MEK), added 0.1 parts of dibutyltindilaurate, at 80° C. The resin concentration of this solution was 30% and its viscosity was 560 Poise at 20° C. The obtained solution was blended to prepare the following paint solution as shown in Table-12.

TABLE-12

| Polyurethane resin solution | 100 parts |
|---|---|
| (EtAC) | 300 parts |
| Titanium dioxide | 5 parts |

After painting this paint solution on a surface of a base material (iron boad) with a brush, it was dried at 150° C. for ten minutes and obtained paint coat of about 100 micron thick.

After a scratch mark was given by a pencil (hardness:5H), the article was placed in the water of 80° C. for about two minutes, and the scratch mark was vanished.

EXAMPLE C-2:

A polyurethane resin (the ring component derived from compound (b1):33% by weight) solution was obtained by reacting 159.7 parts of (b1-2), 21.6 parts of (b2-1) and 118.7 parts of (HMDI) in the mixture of 350 parts of (MEK) and 100 parts of (Tol), added 0.1 parts of dibutyltindilaurate, at 100° C. The resin concentration of this solution was 40% and its viscosity was 50 Poise at 20° C. The obtained solution was blended to prepare the following paint solution as shown in Table-13.

TABLE 13

| Polyurethane resin solution | 100 parts |
|---|---|

TABLE 13-continued

| | | |
|---|---|---|
| (EtAC) | 100 | parts |
| Carbon black | 5 | parts |
| CORONATE HL | 5 | parts |

After spraying this paint on a surface of base material (alminum plate) it was dried at 150° C. for ten minutes. The thickness of the coating was about 150 microns.

After a scratch mark was given to the paint surface with a pencil (hardness:5H), the coating was bathed in the water of 80° C. for two minutes. Then the scratch mark was vanished.

EXAMPLE C-3:

A polyurethane resin (the ring component derived from compound (b1):31% by weight) solution was obtained by reacting 133.5 parts of (b1-3), 26.7 parts of (b2-2), 7.0 parts of (b3-1) and 132.8 parts of (HMDI) in the mixture of 350 parts of (MEK) and 100 parts of (Tol), added 0.1 parts of dibutyltindilaurate, at 100° C. The resin concentration of this solution was 40% and its viscosity was 110 Poise at 20° C. The obtained solution was blended to prepare the following paint solution as shown in Table-14.

TABLE 14

| | | |
|---|---|---|
| Polyurethane resin solution | 100 | parts |
| (MIBK) | 200 | parts |
| Carbon black | 5 | parts |
| CORONATE HL | 5 | parts |

After spraying this paint on a surface of base material (iron boad) it was dried at 150° C. for ten minutes. The thickness of the coating was about 80 microns. After a scratch mark was given to the paint surface with a pencil (hardness:5H), the coating was bathed in the water of 80° C. for two minutes. Then the scratch mark vanished.

EXAMPLE C-4:

Polyurethane resin (the ring component derived from compound (b1):40% by weight) solution, obtained in Example A-4, was blended to prepare the following paint solution as shown in Table-15.

TABLE 15

| | | |
|---|---|---|
| Polyuretane resin solution | 100 | parts |
| (EtAC) | 100 | parts |
| (MEK) | 100 | parts |
| (DMF) | 50 | parts |
| Carbon black | 5 | parts |
| CORONATE HL | 5 | parts |

After spraying this paint on a surface of base material (iron boad) it was dried at 150° C. for ten minutes. The thickness of the paining was about 50 microns. After a scratch mark was given to the paint surface with a pencil (hardness:5H), it was bathed in the water of 80° C. for two minutes. Then the scratch mark was vanished.

EXAMPLE C-5:

A polyurethane resin (the ring component derived from compound (b1):32% by weight) solution was obtained by reacting 97.2 parts of (b1-5), 25.0 parts of (b2-4) and 177.8 parts of (HMDI) in the mixture of 300 parts of (MEK) and 150 parts of (Tol), added 0.1 parts of dibutyltindilaurate, at 100° C. The resin concentration of this solution was 40% and its viscosity was 61 Poise at 20° C. The obtained solution was blended to prepare the following paint solution as shown in Table-16.

TABLE 16

| | | |
|---|---|---|
| Polyurethane resin solution | 100 | parts |
| (EtAC) | 170 | parts |
| Carbon black | 5 | parts |
| CORONATE HL | 5 | parts |

After spraying this paint on a surface of base material (aluminum plate) it was dried at 140° C. for ten minutes. The thickness of the coating was about 70 microns.

After a scratch mark was given to the paint surface with a pencil (hardness:5H), it was bathed in the water of 80° C. for two minutes. Then the scratch mark was vanished.

EXAMPLE C-6:

A polyurethane resin (the ring component derived from compound (b1):39% by weight) solution was obtained by reacting 170.6 parts of (b1-1), 4.2 parts of (b3-2) and 125.2 parts of (IPDI) in the solvent of 450 parts of (MEK), added 0.1 parts of dibutyltindilaurate, at 100° C. The resin concentration of this solution was 40% and its viscosity was 250 Poise at 20° C. The obtained solution was blended to prepare the following paint solution as shown in Table-17.

TABLE 17

| | | |
|---|---|---|
| Polyurethane resin solution | 100 | parts |
| (EtAC) | 200 | parts |
| Carbon black | 5 | parts |
| CORONATE HL | 5 | parts |

After spraying this paint on a surface of base material (iron boad) it was dried at 150° C. for ten minutes. The thickness of the coating was about 50 microns. After a scratch mark was given to the paint surface with a pencil (hardness:5H), it was bathed in the water of 80° C. for two minutes. Then the scratch mark was vanished.

COMPARATIVE EXAMPLE Cc-1:

A polyurethane resin (the ring component derived from compound (b1):6% by weight) solution was obtained by reacting 24.8 parts of (b1-1), 139.9 parts of (b2-1), 24.8 parts of (b3-2), and 110.4 parts of (HMDI) in the mixture of 100 parts of (DMF) and 350 parts of (MIBK), added 0.1 parts of dibutyltindilaurate, at 100° C. The resin concentration of this solution was 40 and its viscosity was 72 Poise at 20° C. The obtained solution was blended to prepare the following paint solution as shown in Table-18.

TABLE 18

| | | |
|---|---|---|
| Polyurethane resin solution | 100 | parts |
| (EtAC) | 200 | parts |
| Carbon black | 5 | parts |
| CORONATE HL | 5 | parts |

After spraying this paint on a surface of base material (iron boad) it was dried at 150° C. for ten minutes. The thickness of the coating was about 80 microns. After a scratch mark was given to the paint surface with a pencil (hardness:5H), it was bathed in the water of 80° C. for two minutes. However in this case the scratch mark was not healed. Furthermore it was heated by a dryer at about 120° C. for five minutes but was not healed yet.

COMPARATIVE EXAMPLE Cc-2:

A polyurethane resin (the ring component derived from compound (b1):7% by weight) solution was obtained by reacting 90.8 parts of (b1-6), 90.8 parts of (b2-2), 19.4 parts of (b3-1), and 99.1 parts of (IPDI) in the mixture of 350 parts of (MEK) and 100 parts of (Tol), added 0.1 parts of dibutyltindilaurate, at 100° C. The resin concentration of this solution was 40% and its viscosity was 520 Poise at 20° C. The obtained solution was blended to prepare the following paint solution as shown in Table-19.

TABLE 19

| Polyurethane resin solution | 100 parts |
|---|---|
| (EtAC) | 200 parts |
| Carbon black | 5 parts |
| CORONATE HL | 5 parts |

After painting this paint on a surface of base material (iron boad) by a brush, it was dried at 150° C. for ten minutes. The thickness of the coating was about 150 microns.

After a scratch mark was given to the paint surface with a pencil (hardness:5H), it was bathed in the water of 80° C. for two minutes. However in this case the scratch mark was not healed. Furthermore it was heated by a deyer at about 120° C. for five minutes but was not healed yet.

COMPARATIVE EXAMPLE Cc-3:

A polyurethane resin (no ring component derived from compound (b1)) solution was obtained by reacting 160.1 parts of (b2-4), 25.6 parts of (b3-1) and 114.3 parts of (HMDI) in the mixture of 350 parts of (MEK) and 100 parts of (DMF), added 0.1 parts of dibutyltindilaurate, at 100° C. The resin concentration of this solution was 40% and its viscosity was 120 Poise at 20° C. The obtained solution was blended to prepare the following paint solution as shown in Table-20

TABLE 20

| Polyurethane resin solution | 100 parts |
|---|---|
| (EtAC) | 100 parts |
| Carbon black | 5 parts |
| CORONATE HL | 5 parts |

After spraying this paint on a surface of base material (aluminum plate) it was dried at 150° C. for ten minutes. The thickness of the coating was about 100 microns. After a scratch mark was given to the paint surface with a pencil (hardness:5H), it was bathed in the water of 80° C. for two minutes. However in this case the scratch mark was not healed. Furthermore it was heated by a dryer at about 120° C. for five minutes but was not healed yet.

EXAMPLE D-1:

The solution of polyurethane resin (component derivered from component (b1):39% by weight) was obtained in Example A-1, was blended to prepare the following solution as shown in Table-21.

TABLE 21

| Polyurethane resin solution | 100 parts |
|---|---|
| (DMF) | 50 parts |
| (MEK) | 50 parts |
| Titanium dioxide | 5 parts |
| CORONATE HL | 5 parts |

At first, the above solution was coated onto a releasing paper with a doctor knife to form a 100 micron thick coat, and dried at a temperature of 130° C. for five minutes. Next, a adhesive agent made of polyurethane compound, SANPRENE LQ-228 (Sanyo Chemical Ind., Japan), was coated over the first coating layer in order to form the second layer of 100 micron thick after drying, then it was dried at 130° C. for one minute. This article and a substrate (raised fabric with polyurethane porous layer) were overlapped and fed into a hot roller which was heated to 170° C., for to press and adhere. Then a synthetic leather was obtained.

After giving a scratch and a crease mark to its surface, it was placed in the water of 80° C. for about one minute. Those flaws were healed.

EXAMPLE D-2:

The pellets of polyurethane resin (the ring component derived from compound (b1):31% by weight) was obtained in Example A-2, was blended to prepare the following solution as shown in Table-22.

TABLE 22

| Polyurethane resin pellets | 30 parts |
|---|---|
| (DMF) | 135 parts |
| (EtAC) | 135 parts |
| Carbon black | 3 parts |

After coating the above solution onto a substrate (a raised fabric with polyurethane porous layer) with a gravure roller, this article was dried at 130° C. for five minutes. A synthetic leather having a coated film of about 35 micron thick was obtained.

After giving a scratch and a crease mark to its surface, it was heated by a dryer at about 120° C. for one minute. Those flaw was healed.

EXAMPLE D-3:

The solution of polyurethane resin (the ring component derived from compound (b1):32% by weight) was obtained in Example A-3, was blended to prepare the following solution as shown in Table-23.

TABLE 23

| Polyurethane resin solution | 100 parts |
|---|---|
| (DMF) | 50 parts |
| (MEK) | 50 parts |
| Titanium dioxide | 5 parts |
| CORONATE HL | 5 parts |

At first, the above solution was coated onto a releasing paper with a doctor knife to form a 100 micron thick coat, and dried at a temperature of 130° C. for five minutes. Next, a adhesive agent made of polyurethane compound, SANPRENELQ-228, was coated over the first coating layer in order to form the second layer of 100 micron thick after drying, then it was dried at 130° C. for one minute. This article and a substrate (raised fabric with polyurethane resin porous layer) were overlapped and feeded into a hot roller which was heated to 170° C., for to press and adhere. Then a synthetic leather was obtained.

After giving a scratch and a crease mark to its surface, it was placed in the water of 80° C. for about one minute. Those flaws were healed.

EXAMPLE D-4:

The solution of polyurethane resin (the ring component derived from compound (b1):40% by weight) was obtained in Example A-4, was blended to prepare the following solution as shown in Table-24.

TABLE 24

| | |
|---|---|
| Polyurethane resin solution | 100 parts |
| (DMF) | 50 parts |
| (MEK) | 50 parts |
| Titanium dioxide | 5 parts |
| CORONATE HL | 5 parts |

At first, the above solution was coated onto a releasing paper with a doctor knife to form a 100 micron thick coat, and dried at a temperature of 130° C. for five minutes. Next, a adhesive agent made of polyurethane compound, SANPRENE LQ-228, was coated over the first coating layer in order to form the second layer of 100 micron thick after drying, then it was dried at 130° C. for one minute. This article and a substrate (raised fabric with polyurethane porous layer) were overlapped and fed into a hot roller which was heated to 170° C., for to press and adhere. Then a synthetic leather was obtained.

After giving a scratch and a crease mark to its surface, it was placed in the water of 80° C. for about one minute. Those flaws were healed.

EXAMPLE C-5:

The pellets of polyurethane resin (the ring component derived from compound (b1):33% by weight) was obtained in Example A-5, was blended to prepare the following solution as shown in Table-25.

TABLE 25

| | |
|---|---|
| Polyurethane resin pellets | 30 parts |
| (DMF) | 135 parts |
| (EtAC) | 135 parts |
| Carbon black | 3 parts |

After coating the above solution onto a substrate (raised fabric with polyurethane porous layer) with a gravure roller, this article was dried at 130° C. for five minutes. A synthetic leather having a coated film of about 50 micron thick was obtained.

After giving a scratch and a crease mark to its surface, it was heated by a dryer at about 120° C. for one minute. Those flaws were healed.

EXAMPLE D-6:

The solution of polyurethane resin (the ring component derived from compound (b1):37% by weight) was obtained in Example A-6, was blended to prepare the following solution as shown in Table-26.

TABLE 26

| | |
|---|---|
| Polyurethane resin solution | 100 parts |
| (DMF) | 250 parts |
| (MEK) | 250 parts |
| Carbon black | 5 parts |

After coating by a splayer the above solution onto a substrate (a synthetic leather made of polyvinylchloride), this article was dried at 140° C. for three minutes to form a coated film of about 50 micron thick after drying. A synthetic leather was obtained.

After giving a scratch and a crease mark to its surface, it was placed in the water of 80° C. for about one minute. Those flaw could not be found out.

COMPARATIVE EXAMPLE Dc-1:

The pellets of polyurethane resin (the ring component derived from compound (b1):6% by weight) was obtained in Example Ac-1, was blended to prepare the following solution as shown in Table-27.

TABLE 27

| | |
|---|---|
| Polyurethane resin pellets | 30 parts |
| (DMF) | 135 parts |
| (EtAC) | 135 parts |
| Carbon black | 3 parts |

After coating the above solution onto a substrate (raised fabric with polyurethane porous layer) with a gravure roller, this article was dried at 130° C. for five minutes. A synthetic leather having a coated film of about 38 micron thick was obtained.

After giving a scratch and a crease mark to its surface, it was placed in the water of 80° C. for about two minutes. Those flaw were not healed. Furthermore, it was heated by a dryer at about 120° C. for five minutes. However, those flaw were not yet healed.

COMPARATIVE EXAMPLE Dc-2:

The solution of polyurethane resin (component derivered from component (b1):6% by weight) was obtained in Example Ac-2, was blended to prepare the following solution as shown in Table-28.

TABLE 28

| | |
|---|---|
| Polyurethane resin solution | 100 parts |
| (DMF) | 50 parts |
| (MEK) | 50 parts |
| Titanium dioxide | 5 parts |
| CORONATE HL | 5 parts |

At first, the above solution was coated onto a releasing paper with a doctor knife to form a 100 micron thick coat, and dried at a temperature of 130° C. for five minutes. Next, a adhesive agent made of polyurethane compound, SANPRENE LQ-228, was coated over the first coating layer in order to form the second layer of 100 micron thick after drying, then it was dried at 130° C. for one minute. This article and a substrate (raised fabric with polyurethane porous layer) were overlapped and feeded into a hot roller which was heated to 170° C., for to press and adhere. Then a synthetic leather was obtained.

After giving a scratch and a crease mark to its surface, it was placed in the water of 80° C. for about two minutes. Those flaws were not healed. Then furthermore it was heated at about 120° C. for five minutes but those flaw was not healed.

COMPARATIVE EXAMPLE Dc-3:

The solution of polyurethane resin (no component derivered from component (b1)) was obtained in Example Ac-3, was blended to prepare the following solution as shown in Table -29.

TABLE 29

| | |
|---|---|
| Polyurethane resin solution | 100 parts |
| (DMF) | 50 parts |
| (MEK) | 50 parts |
| Titanium dioxide | 5 parts |

TABLE 29-continued

| CORONATE HL | 5 parts |
| --- | --- |

At first, the above solution was coated onto a releasing paper with a doctor knife to form a 100 micron thick coat, and dried at a temperature of 130° C. for five minutes. Next, a adhesive agent made of polyurethane compound, SANPRENE LQ-228, was coated over the first coating layer in order to form the second layer of 100 micron thick after drying, then it was dried at 130° C. for one minute. This article and a substrate (raised fabric with polyurethane porous layer) were overlapped and fed into a hot roller which was heated to 170° C., for to press and adhere. Then a synthetic leather was obtained.

After giving a scratch and a crease mark to its surface, it was placed in the water of 80° C. for about two minutes. Those flaws were not healed. Then furthermore it was heated at about 120° C. for five minutes but those flaw was not healed.

EXAMPLE E-1

28.1 parts of (b1-1), 15 parts of (b2-2) and 0.7 parts of (b3-3) was mixed in a beaker at a temperature of 100° C.. Next, 27.5 parts of melted (MDI) which was heated at 60° C., was poured into the beaker, and was mixed enough by a screw type agitator for 30 seconds. Immediately after degassing in 3 mmHg for one minute, the mixture was poured into a mold which was preheated to 120° C. After keeping at 120° C. for two hours, a hardened molded article was taken out. This article was cured at 60° C. for fifteen hours followed by another curing at 27° C. for one week. A thermoset sheet article of 2 mm thick comprising a polyurethane resin (the ring component derived from compound (b1):27% by weight in the resin, polyol compound (b1) in the total reacted polyol:87% by equivalent weight) was obtained.

This obtained article was cut to the size of 1 cm by 10 cm, bent by 90 degrees at 80° C. to make a bent shape, and cooled down to 27° C., then this small sheet was locked in that bent shape. It was placed in the water of 80° C., and reverted back to the original shape completely in less than 30 seconds. A separate small sheet of the same article kept in the bent shape at 25° C. for two weeks, however it was placed in the water of 80° C. then it reverted back completely to the original shape in less than 30 seconds.

EXAMPLE E-2

243.1 parts of (b1-3), 55.8 parts of (b2-3) and 5 parts of (b3-3) was mixed in a beaker at a temperature of 100° C. Next, 196.2 parts of melted (MDI) which was heated at 60° C., was poured into the beaker, and was mixed enough by a screw type agitator for 30 seconds. Immediately after degassing in 3 mmHg for one minute, the mixture was poured into a mold which was preheated to 120° C. After keeping at 120° C. for two hours, a hardened molded article was taken out. This article was cured at 60° C. for fifteen hours followed by another curing at 27° C. for one week. A thermoset sheet article of 2 mm thick comprising a polyurethane resin (the ring component derived from compound (b1):34% by weight in the resin, polyol compound (b1) in the total reacted polyol:87% by equivalent weight) was obtained.

This obtained article was cut to the size of 1 cm by 10 cm, bent by 90 degrees at 80° C. to make a bent shape, and cooled down to 27° C., then this small sheet was locked in that bent shape. It was placed in the water of 80° C., and reverted back to the original shape completely in less than 30 seconds. A separate small sheet of the same article kept in the bent shape at 25° C. for two weeks, however it was placed in the water of 80° C. then it reverted back completely to the original shape in less than 30 seconds.

EXAMPLE E-3

By reacting 786 parts of (HMDI), 107.2 parts of (HDI Biuret) and 330 parts of (b1-1) with 0.12 parts of dibutyltindilaurate as a catalyst at 100° C. for five hours, a prepolymer (P1) containing 15.8% of free NCO was obtained. 98.1 parts of (b2-1) and 102.5 parts of (b1-1) was mixed in a beaker at a temperature of 110° C. Next, 200 parts of the melted prepolymer (P1) which was heated at 70° C. and 0.2 parts of dibutyltindilaurate as a catalyst, was poured into the beaker, and was mixed enough by a screw type agitator for 30 seconds. Immediately after degassing in 3 mmHg for one minute, the mixture was poured into a mold which was preheated to 120° C. After keeping at 120° C. for five hours, a hardened molded article was taken out. This article was cured at 70° C. for fifteen hours followed by another curing at 27° C. for one week. A thermoset sheet article of 2 mm thick comprising a polyurethane resin (the ring component derived from compound (b1):29% by weight in the resin, polyol compound (b1) in the total reacted polyol:91% by equivalent weight) was obtained.

This obtained article was cut to the size of 1 cm by 10 cm, bent by 90 degrees at 70° C. to make a bent shape, and cooled down to 28° C., then this small sheet was locked in that bent shape. It was placed in the water of 70° C., and reverted back to the original shape completely in less than 30 seconds. A separate small sheet of the same article kept in the bent shape at 25° C. even after two weeks.

COMPARATIVE EXAMPLE Ec-1

6.3 parts of (b3-2), 45 parts of (b2-2) and 0.7 parts of (b3-3) was mixed in a beaker at a temperature of 100° C. Next, 26.3 parts of melted (MDI) which was heated at 60° C. was poured into the beaker, and was mixed enough by a screw type agitator for 30 seconds. Immediately after degassing in 3 mmHg for one minute, the mixture was poured into a mold which was preheated to 120° C. After keeping at 120° C. for two hours, a hardened molded article was taken out. This article was cured at 60° C. for fifteen hours followed by another curing at 27° C. for one week. A thermoset sheet article of 2 mm thick comprising a polyurethane resin (no polyol compound (b1)) was obtained.

This obtained article was cut to the size of 1 cm by 10 cm, bent by 90 degrees at 80° C. to make a bent shape, and cooled down to 28° C., for to lock in that bent shape. However the bent shape article reverted back to the original flat shape soon, then could not lock in the bent shape.

EXAMPLES F-1, 2, COMPARATIVE EXAMPLES Fc-1, 2:

After spraying the paint article which was obtained in Example C-1 (Table-13), on the two sheet articles of 2 mm thick which was obtained in Example A-2 and Example E-1, it was dried at 130° C. for 30 minutes, then each articles were covered by paint film of about 50 micons were obtained. ABS sheet of 2 mm thick and iron boad was also coated with the same point.

Scratch marks were given on the surface of the above each articles by a pencile (hardness:5H) and a needle (top:hemisphere of 0.5 mm diameter). After the above treatment, each articles were placed in the water of 80° C. for about two minutes. Healability of each articles were observed. The Table-30 shows the results of each Example together.

TABLE 30

| Example (Comparative) | F-1 | F-2 | Fc-1 | Fc-2 |
| --- | --- | --- | --- | --- |
| Base material | Example A-2 | Example E-1 | ABS | Iron boad |
| Paint | Example C-2 | Example C-2 | Example C-2 | Example C-2 |
| Coat thickness | 50 micron | 50 micron | 50 micron | 50 micron |
| Type of Flaw | | | | |
| by pencil | dent | dent | dent | dent |
| by needle | dent | dent | dent | cut |
| Healability | | | | |
| Pencil flaw | healed | healed | healed | healed |
| Needle flaw | healed | healed | trace flaw | not healed |

EXAMPLE G:

The article obtained in Example F-1, cut to the size of 1 cm by 10 cm, was bent by 90 degrees at 80° C., and cooled down to 27° C. to be locked in the bent shape. When the article was placed in the water of 80° C., it reverted back to the original shape in less than 30 seconds. Another piece of the article, which was kept in such shape and left at 25° C. for two weeks, reverted back to the original shape in less than 30 seconds when it was placed in the water of 80° C.

EXAMPLE H:

The article obtained in Example F-1, cut to the size of 1 cm by 10 cm, was wound around a glass stick (10 mm diameter) to form a coil shape and fixed at both ends by strings, which was given a heat treatment of 150° C. for 30 minutes. After it was cooled down to 25° C. when it was taken off.

After the article was kept at 25° C. for ten days, it still maintained the coil shape. The coil-shaped article was reshaped to a flat shape at 80° C. and cooled down to 25° C. to be locked in their shape. Such reshaped article was kept in the flat shape for ten days, it reverted back to the original coiled shape in less than 30 seconds when it was placed in the water of 80° C.

EXAMPLE I:

The article obtained in Example F-2, in the size of 1 cm by 10 cm, was bent by 90 degrees at 80° C., and cooled down to 27° C. to lock the bent shape. Then it was placed in the water of 80° C., and it reverted back to the original shape in less than 30 seconds. Another piece of said article which was left in the bent shape at 25° C. for two weeks, was then placed in the water of 80° C., and it reverted back to the original shape in less than 30 seconds.

What is claimed is:

1. A thermoplastic article characterized with a memory shape comprising a polyurethane resin obtained by reacting an organic polyisocyanate with at least one polyol selected from the group consisting of

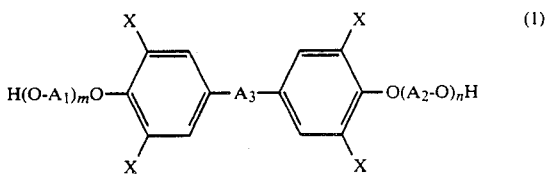

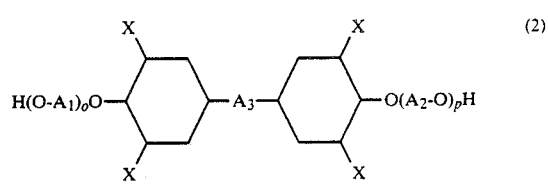

and

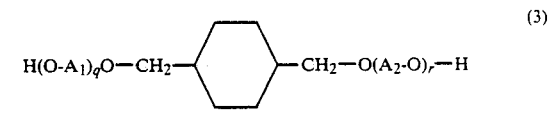

wherein:

$A_3$ is

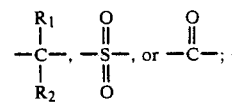

and $R_1$, $R_2$ are each hydrogen, an alkyl group having 1~3 carbon atoms, fluorine, or chlorine;

$A_1$ and $A_2$ are each an alkylene group having 2~4 carbon atoms;

m and n are each a positive integer satisfying $2 \leq m+n \leq 10$ o and p are each 0 or a positive integer satisfying $0 \leq o+p \leq 10$ q and r are each 0 or a positive integer satisfying $0 \leq q+r \leq 10$ X is hydrogen, or a methyl group;

and wherein at least about 15% by weight in the polyurethane resin comprises at least one ring component shown by the following

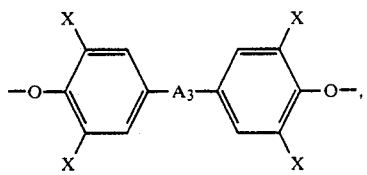

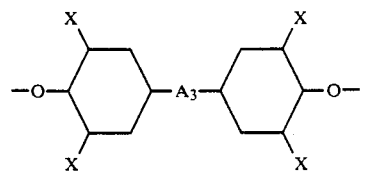

and

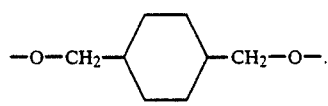

wherein $A_3$ and X are as defined above.

2. A porous sheet characterized with a memory shape comprising a polyurethane resin obtained by reacting an organic polyisocyanate with at least one polyol selected from the group consisting of

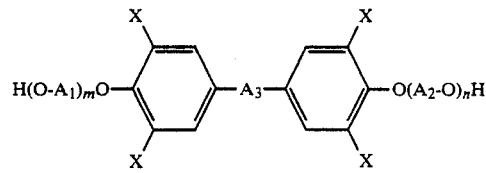 (1)

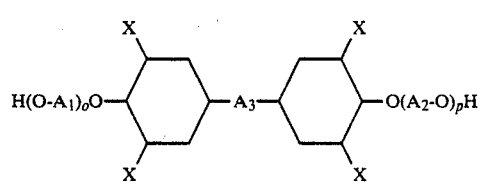 (2)

and

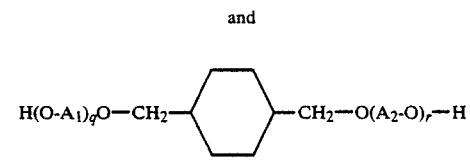 (3)

wherein:
$A_3$ is

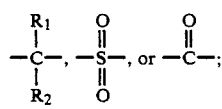

and $R_1$ $R_2$ are each hydrogen, an alkyl group having 1~3 carbon atoms, fluorine, or chlorine;
$A_1$ and $A_2$ are each an alkylene group having 2~4 carbon atoms
m and n are each a positive integer satisfying $2 \leq m+n \leq 10$
o and p are each 0 or a positive integer satisfying $0 \leq o+p \leq 10$
q and r are each 0 or a positive integer satisfying $0 \leq q+r \leq 10$
X is hydrogen, or a methyl group;
and wherein at least about 15% by weight in the polyurethane resin comprises at least one ring component shown by the following

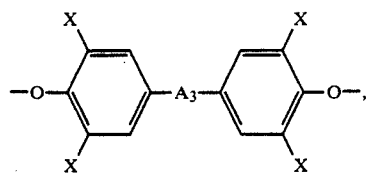

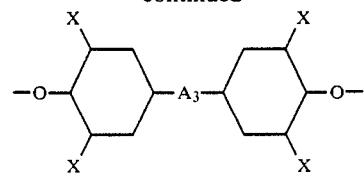

and

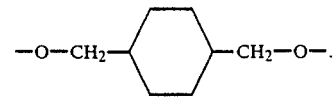

wherein $A_3$ and X are as defined above.

3. A paint composition characterized with healable characteristics comprising a polyurethane resin obtained by reacting an aliphatic and/or alicyclic polyisocyanates with at least one polyol selected from the group consisting of;

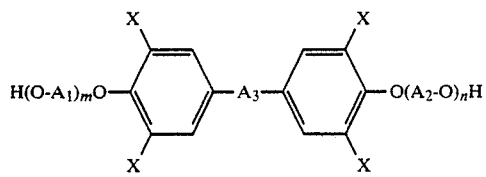 (1)

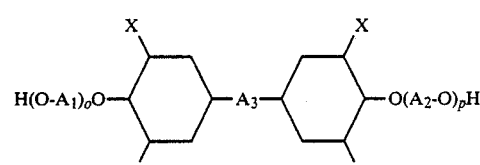 (2)

and

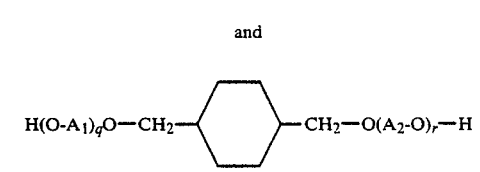 (3)

wherein:
$A_3$ is

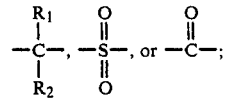

and $R_1$, $R_2$ are each hydrogen, an alkyl group having 1~3 carbon atoms, fluorine, or chlorine;
$A_1$ and $A_2$ are each an alkylene group having 2~4 carbon atoms
m and n are each a positive integer satisfying $2 \leq m+n \leq 10$
o and p are each 0 or a positive integer satisfying $0 \leq +p \leq 10$
q and r are each 0 or a positive integer satisfying $0 \leq q+r \leq 10$
X is hydrogen, or a methyl group;
and wherein at least about 15% by weight in the polyurethane resin comprises at least one ring component shown by the following $$-O-\underset{X}{\overset{X}{\underset{|}{\bigcirc}}}-A_3-\underset{X}{\overset{X}{\underset{|}{\bigcirc}}}-O-,$$

$$-O-\underset{X}{\overset{X}{\underset{|}{\bigcirc}}}-A_3-\underset{X}{\overset{X}{\underset{|}{\bigcirc}}}-O-$$

and $$-O-CH_2-\bigcirc-CH_2-O-.$$

wherein $A_3$ and X are as defined above.

4. A synthetic leather characterized with healable characteristics coated with a polyurethane resin obtained by reacting an organic polyisocyanate with at least one polyol selected from the group consisting of;

$$H(O-A_1)_mO-\underset{X}{\overset{X}{\underset{|}{\bigcirc}}}-A_3-\underset{X}{\overset{X}{\underset{|}{\bigcirc}}}-O(A_2-O)_nH \quad (1)$$

$$H(O-A_1)_oO-\underset{X}{\overset{X}{\underset{|}{\bigcirc}}}-A_3-\underset{X}{\overset{X}{\underset{|}{\bigcirc}}}-O(A_2-O)_pH \quad (2)$$

and $$H(O-A_1)_qO-CH_2-\bigcirc-CH_2-O(A_2-O)_r-H \quad (3)$$

wherein:
$A_3$ is $$-\underset{R_2}{\overset{R_1}{\underset{|}{C}}}-, \; -\underset{O}{\overset{O}{\underset{\|}{S}}}-, \; \text{or} \; -\overset{O}{\underset{\|}{C}}-;$$

and $R_1$, $R_2$ are each hydrogen, an alkyl group having 1~3 carbon atoms, fluorine, or chlorine;
$A_1$ and $A_2$ are each an alkylene group having 2~4 carbon atoms
m and n are each a positive integer satisfying $2 \leq m+n \leq 10$
o and p are each 0 or a positive integer satisfying $0 \leq o+p \leq 10$ q and r are each 0 or a positive integer satisfying $0 \leq q+r \leq 10$
X is hydrogen, or a methyl group;
and wherein at least about 15% by weight in the polyurethane resin comprises at least one ring component shown by the following $$-O-\underset{X}{\overset{X}{\underset{|}{\bigcirc}}}-A_3-\underset{X}{\overset{X}{\underset{|}{\bigcirc}}}-O-,$$

$$-O-\underset{X}{\overset{X}{\underset{|}{\bigcirc}}}-A_3-\underset{X}{\overset{X}{\underset{|}{\bigcirc}}}-O-$$

and $$-O-CH_2-\bigcirc-CH_2-O-.$$

wherein $A_3$ and X are as defined above.

5. A thermoset article characterized with a memory shape comprising a polyurethane resin obtained by reacting an organic polyisocyanate with at least one polyol selected from the group consisting of;

$$H(O-A_1)_mO-\underset{X}{\overset{X}{\underset{|}{\bigcirc}}}-A_3-\underset{X}{\overset{X}{\underset{|}{\bigcirc}}}-O(A_2-O)_nH \quad (1)$$

$$H(O-A_1)_oO-\underset{X}{\overset{X}{\underset{|}{\bigcirc}}}-A_3-\underset{X}{\overset{X}{\underset{|}{\bigcirc}}}-O(A_2-O)_pH \quad (2)$$

and $$H(O-A_1)_qO-CH_2-\bigcirc-CH_2-O(A_2-O)_r-H \quad (3)$$

wherein:
$A_3$ is $$-\underset{R_2}{\overset{R_1}{\underset{|}{C}}}-, \; -\underset{O}{\overset{O}{\underset{\|}{S}}}-, \; \text{or} \; -\overset{O}{\underset{\|}{C}}-;$$

and $R_1$, $R_2$ are each hydrogen, an alkyl group having 1~3 carbon atoms, fluorine, or chlorine;
$A_1$ and $A_2$ are each an alkylene group having 2~4 carbon atoms m and n are each a positive integer satisfying
$2 \leq m+n \leq 10$ o and p are each 0 or a positive integer satisfying
$0 \leq o+p \leq 10$ q and r are each 0 or a positive integer satisfying
$0 \leq q+r \leq 10$ X is hydrogen, or a methyl group;

and there being of the polyol(s) at least about 80% by equivalent weight in a total reacted polyol(s), and wherein at least about 15% by weight in the polyurethane resin comprises at least one ring component shown by the following

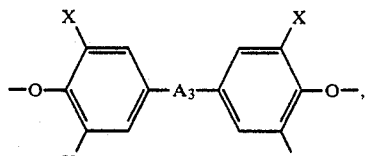

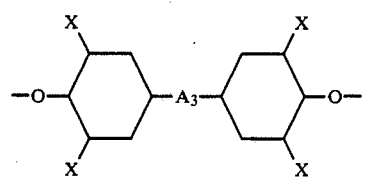

and

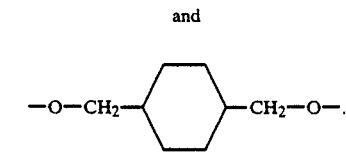

wherein $A_3$ and X are as defined above.

6. A method for preparing said porous sheet of claim 2, comprising the steps of:

preparing a polyurethane resin solution which comprises said polyurethane resin and an organic solvent, coating the polyurethane resin solution on a support, contacting the support with the polyurethane resin solution coated thereon, with a solvent which is a non-solvent for said polyurethane resin and a solvent for the organic solvent, to extract the organic solvent from the coated support and to convert the polyurethane resin into a porous sheet, and separating said porous sheet from the support.

7. A method for preparing said porous sheet of claim 2, comprising the steps of:

preparing a polyurethane resin solution which comprises said polyurethane resin and an organic solvent, impregnating or coating a substrate with the polyurethane resin solution, contacting the substrate with the polyurethane resin solution impregnated or coated thereon with a solvent which is a non-solvent for said polyurethane resin and a solvent for the organic solvent to extract the organic solvent from the impregnated or coated substrate and convert the polyurethane resin into porous sheet.

8. A thermoplastic article characterized with a memory shape, said article having coated with a paint characterized with healable characteristics comprising a polyurethane resin obtained by reacting an aliphatic and/or alicyclic polyisocyanate with at least one polyol selected from the group consisting of;

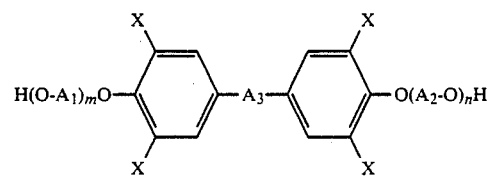 (1)

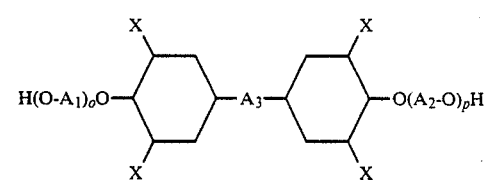 (2)

and

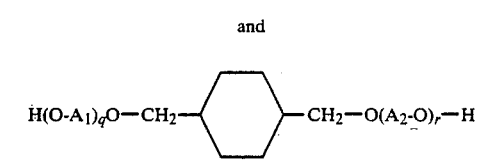 (3)

wherein:

$A_3$ is

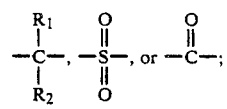

and $R_1$, $R_2$ are each hydrogen, an alkyl group having 1~3 carbon atoms, fluorine, or chlorine;

$A_1$ and $A_2$ are each an alkylene group having 2~4 carbon-atoms m and n are each a positive integer satisfying
$2 \leq m+n \leq 10$ o and p are each 0 or a positive integer satisfying
$0 \leq o+p \leq 10$ q and r are each 0 or a positive integer satisfying
$0 \leq q+r \leq 10$ X is hydrogen, or a methyl group;

and wherein at least about 15% by weight in the polyurethane resin comprises at least one ring component shown by the following

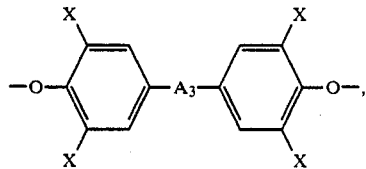

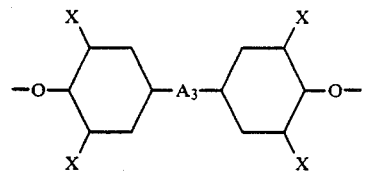

and

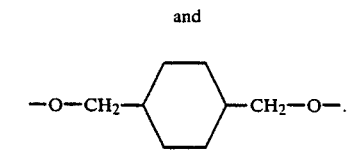

wherein $A_3$ and X are as defined above.

9. A thermoset article characterized with a memory shape, said article having coated with a paint characterized with healable characteristics comprising a polyurethane resin obtained by reacting an aliphatic and/or alicyclic polyisocyanate, with at least one polyol selected from the group consisting of;

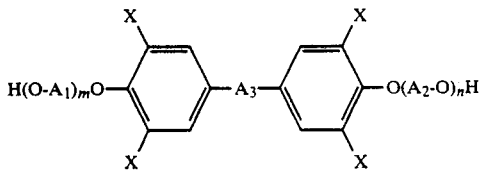  (1)

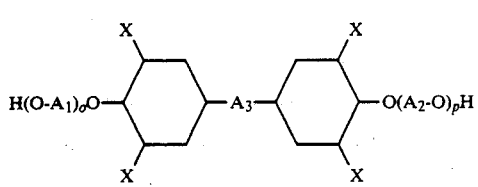  (2)

and

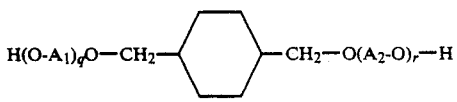  (3)

wherein:
A₃ is

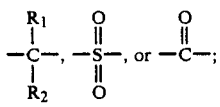

and $R_1$, $R_2$ are each hydrogen, an alkyl group having 1~3 carbon atoms, fluorine, or chlorine;
$A_1$ and $A_2$ are each an alkylene group having 2~4 carbon atoms
m and n are each a positive integer satisfying $2 \leq m+n \leq 10$
o and p are each 0 or a positive integer satisfying $0 \leq o+p \leq 10$
q and r are each 0 or a positive integer satisfying $0 \leq q+r \leq 10$
X is hydrogen, or a methyl group;
and wherein at least about 15% by weight in the polyurethane resin comprises at least one ring component shown by the following

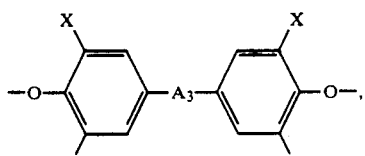

and

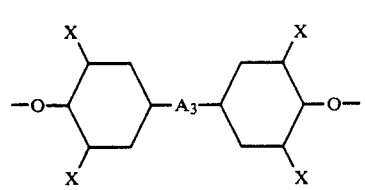

-continued

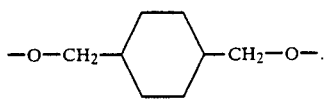

wherein $A_3$ and X are as defined above.

10. The thermoplastic article of claim 1, wherein the memorized shape is an original, determined shape and is formed by maintaining said thermoplastic article in the original, determined shape at a temperature of 130~230° C.

11. The thermoplastic article of claim 8, wherein the memorized shape is an original, determined shape and is formed by maintaining said thermoplastic article in the original, determined shape at a temperature of 130~230° C.

12. The porous sheet of claim 2, wherein the memorized shape is an original, determined shape and is formed by maintaining said porous sheet in the original, determined shape at a temperature of 130~230° C.

13. The porous sheet prepared by the method of claim 6, wherein the memorized shape is an original, determined shape comprising a subsequent step of maintaining said porous sheet in the original, determined shape at a temperature of 130~230° C.

14. The porous sheet prepared by the method of claim 7, wherein the memorized shape an original, determined shape comprising a subsequent step of maintaining said porous sheet in the original, determined shape at a temperature of 130~230° C.

15. The thermoplastic article of claim 1, wherein the memorized shape is reshaped into another desired form below about 30° C. and locked into the reshaped form below about 40° C.

16. The thermoplastic article of claim 8, wherein the memorized shape is reshaped into another desired form below about 30° C. and locked into the reshaped form below about 40° C.

17. The thermoplastic article of claim 10, wherein the memorized shape is reshaped into another desired form below about 30° C. and locked into the reshaped form below about 40° C.

18. The thermoplastic article of claim 11, wherein the memorized shape is reshaped into another desired form below about 130° C. and locked into the reshaped form below about 40° C.

19. The porous sheet of claim 2, wherein the memorized shape is reshaped into another desired form below about 130° C. and locked into the reshaped form below about 40° C.

20. The porous sheet produced by the method of claim 6, wherein the memorized shape is reshaped by a subsequent step into another desired form below about 130° C. and locked into the reshaped form below about 40° C.

21. The porous sheet produced by the method of claim 7, wherein the memorized shape is reshaped by a subsequent step into another desired form below about 130° C. and locked into the reshaped form below about 40° C.

22. The porous sheet of claim 12, wherein the memorized shape is reshaped into another desired form below about 130° C. and locked into the reshaped form below about 40° C.

23. The porous sheet of claim 13, wherein the memorized shape is reshaped into another desired form below about 130° C. and locked into the reshaped form below about 40° C.

24. The porous sheet of claim 14, wherein the memorized shape is reshaped into another desired form below about 130° C. and locked into the reshaped form below about 40° C.

25. The thermoset article of claim 5, wherein the memorized shape is reshaped into another desired form below about 130° C. and locked into the reshaped form below about 40° C.

26. The thermoset article of claim 9, wherein the memorized shape is reshaped into another desired form below about 130° C. and locked into the reshaped form below about 40° C.

27. A method for reverting the reshaped form of said thermoplastic article of claim 15, to said original shape thereof comprising heating said reshaped form above about 40° C.

28. A method for reverting the reshaped form of said thermoplastic article of claim 16, to said original shape thereof comprising heating said reshaped form above about 40° C.

29. A method for reverting the reshaped form of said thermoplastic article of claim 17, to said original shape thereof comprising heating said reshaped form above about 40° C.

30. A method for reverting the reshaped form of said thermoplastic article of claim 18, to said original shape thereof comprising heating said reshaped form above about 40° C.

31. A method for reverting the reshaped form of said porous sheet of claim 19, to the original shape thereof comprising heating said reshaped form above about 40° C.

32. A method for reverting the reshaped form of said porous sheet of claim 20, to the original shape thereof comprising heating said reshaped form above about 40° C.

33. A method for reverting the reshaped form of said porous sheet of claim 21, to the original shape thereof comprising heating said reshaped form above about 40° C.

34. A method for reverting the reshaped form of said porous sheet of claim 22, to the original shape thereof comprising heating said reshaped form above about 40° C.

35. A method for reverting the reshaped form of said porous sheet of claim 23, to the original shape thereof comprising heating said reshaped form above about 40° C.

36. A method for reverting the reshaped form of said porous sheet of claim 24, to the original shape thereof comprising heating said reshaped form above about 40° C.

37. A method for reverting the reshaped form of said thermoset article of claim 25, to said original shape thereof comprising heating said reshaped form above about 40° C.

38. A method for reverting the reshaped form of said thermoset article of claim 26, to said original shape thereof comprising heating said reshaped form above about 40° C.

39. A method for healing, from a marred coating, a coating derived from said paint composition of claim 3, which comprises heating the marred coating above about 40° C.

40. A method for healing, from a marred coating, the coating coated on said thermoplastic article of claim 8, which comprises heating the marred coating above about 40° C.

41. A method for healing, from a marred coating, the coating coated on said thermoset article of claim 9, which comprises heating the marred coating above about 40° C.

42. A method for healing, from a marred coated surface, a coated surface of said synthetic leather of claim 4, which comprises heating the marred coated surface above about 40° C.

* * * * *